US009869555B2

(12) United States Patent
Sakai et al.

(10) Patent No.: US 9,869,555 B2
(45) Date of Patent: Jan. 16, 2018

(54) CONSTRUCTION MACHINE CONTROL SYSTEM, CONSTRUCTION MACHINE, CONSTRUCTION MACHINE MANAGEMENT SYSTEM, AND CONSTRUCTION MACHINE CONTROL METHOD AND PROGRAM

(71) Applicant: Komatsu Ltd., Tokyo (JP)

(72) Inventors: Atsushi Sakai, Tokyo (JP); Mitsuhiro Ryuman, Tokyo (JP); Masanori Tojima, Tokyo (JP); Akiharu Nishijima, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/123,039

(22) PCT Filed: Oct. 30, 2015

(86) PCT No.: PCT/JP2015/080864
§ 371 (c)(1),
(2) Date: Sep. 1, 2016

(87) PCT Pub. No.: WO2016/060281
PCT Pub. Date: Apr. 21, 2016

(65) Prior Publication Data
US 2017/0122741 A1    May 4, 2017

(51) Int. Cl.
*G01C 21/00*    (2006.01)
*G05D 1/02*    (2006.01)
(Continued)

(52) U.S. Cl.
CPC .............. *G01C 21/005* (2013.01); *B60P 1/04* (2013.01); *G01S 13/86* (2013.01); *G01S 13/931* (2013.01);
(Continued)

(58) Field of Classification Search
CPC ...... G01C 21/005; G01S 13/86; G01S 13/931; G01S 19/46; G01S 2013/9367;
(Continued)

(56) References Cited

U.S. PATENT DOCUMENTS 5,555,503 A * 9/1996 Kyrtsos ................. G08G 1/202
342/357.24
5,610,815 A * 3/1997 Gudat ................... G08G 1/202
318/587
(Continued)

FOREIGN PATENT DOCUMENTS

JP    10-300493 A    11/1998
JP    11-242520 A    9/1999
(Continued)

OTHER PUBLICATIONS

Meguro et al., "Development of an Autonomous Mobile Surveillance System Using a Network-Based RTK-GPS", IEEE International Conference on Robotics and Automation, Apr. 2005, pp. 3096-3101.*

(Continued)

*Primary Examiner* — Todd Melton
(74) *Attorney, Agent, or Firm* — Locke Lord LLP

(57) ABSTRACT

A construction machine control system for a construction machine that travels along a travel route, includes: a position detection unit that detects a position of the construction machine; a determination unit that determines whether an error in the position detected by the position detection unit is equal to or smaller than a predetermined error; a non-contact sensor that detects a position of an object around the construction machine; and a map information storage unit that extracts a detection result related to a vertical projection that protrudes vertically from a detection result of the non-contact sensor and stores the extracted detection result related to the vertical projection as map information when
(Continued)

the determination unit determines that the error in the position detected by the position detection unit is equal to or smaller than the predetermined error.

10 Claims, 13 Drawing Sheets

(51) Int. Cl.
*G08G 1/16* (2006.01)
*G01S 13/93* (2006.01)
*G01S 19/46* (2010.01)
*B60P 1/04* (2006.01)
*G01S 13/86* (2006.01)

(52) U.S. Cl.
CPC ............ *G01S 19/46* (2013.01); *G05D 1/0276* (2013.01); *G08G 1/16* (2013.01); *G01S 2013/9367* (2013.01); *G05D 2201/021* (2013.01); *G05D 2201/0202* (2013.01)

(58) Field of Classification Search
CPC ......... G05D 1/0276; G05D 2201/0202; G05D 2201/021; G08G 1/16
See application file for complete search history.

(56) References Cited

U.S. PATENT DOCUMENTS

| | | | |
|---|---|---|---|
| 6,064,926 A | 5/2000 | Sarangapani et al. | |
| 6,751,535 B2 | 6/2004 | Mori | |
| 7,266,477 B2* | 9/2007 | Foessel ................ | G01S 13/723 340/436 |
| 7,756,615 B2* | 7/2010 | Barfoot ................ | G05D 1/0297 180/168 |
| 8,554,478 B2* | 10/2013 | Hartman ............... | G01S 17/023 180/167 |
| 8,996,228 B1* | 3/2015 | Ferguson ........... | G01C 21/3461 348/118 |
| 2002/0099481 A1 | 7/2002 | Mori | |
| 2010/0066587 A1* | 3/2010 | Yamauchi ........... | G05D 1/0044 342/70 |

FOREIGN PATENT DOCUMENTS

| | | |
|---|---|---|
| JP | 2002-215236 A | 7/2002 |
| JP | 2008-116370 A | 5/2008 |

OTHER PUBLICATIONS

International Search Report dated Jan. 26, 2016, issued for PCT/JP2015/080864.

* cited by examiner

CONSTRUCTION MACHINE CONTROL SYSTEM, CONSTRUCTION MACHINE, CONSTRUCTION MACHINE MANAGEMENT SYSTEM, AND CONSTRUCTION MACHINE CONTROL METHOD AND PROGRAM

FIELD

The present invention relates to a construction machine control system, a construction machine, a construction machine management system, and a construction machine control method and program.

BACKGROUND

Mining machines as a construction machine such as a dump truck as disclosed in Patent Literature 1 operate in an excavation site of a mine.

CITATION LIST

Patent Literature

Patent Literature 1: Japanese Laid-open Patent Publication No. 11-242520

SUMMARY

Technical Problem

A construction machine that travels autonomously along a travel route in a mine may stop its operation when the accuracy of the position detected using a global navigation satellite system decreases due to an abnormality in the ionosphere. As a result, the productivity of a mine may decrease.

An object of the present invention is to provide a construction machine control system, a construction machine, a construction machine management system, and a construction machine control method and program.

Solution to Problem

According to the present invention, a construction machine control system for a construction machine that travels along a travel route, comprises: a position detection unit that detects a position of the construction machine; a determination unit that determines whether an error in the position detected by the position detection unit is equal to or smaller than a predetermined error; a non-contact sensor that detects a position of an object around the construction machine; and a map information storage unit that extracts a detection result related to a vertical projection that protrudes vertically from a detection result of the non-contact sensor and stores the extracted detection result related to the vertical projection as map information when the determination unit determines that the error in the position detected by the position detection unit is equal to or smaller than the predetermined error.

In the present invention, it is preferable that the map information storage unit stops storing the map information when a stopped state of the construction machine is detected.

In the present invention, it is preferable that the construction machine control system further comprises: a position measurement unit that specifies the position of the construction machine by comparing the detection result of the non-contact sensor and the map information stored by the map information storage unit when the determination unit determines that the error in the position detected by the position detection unit exceeds the predetermined error.

In the present invention, it is preferable that the position measurement unit stops specifying the position of the construction machine by comparing the detection result of the non-contact sensor and the map information stored by the map information storage unit when a stopped state of the construction machine is detected.

In the present invention, it is preferable that when the determination unit determines that the error in the position detected by the position detection unit is equal to or smaller than the predetermined error, the position measurement unit compares the detection result of the non-contact sensor and the map information stored by the map information storage unit to specify the position of the construction machine and determines whether it is appropriate to allow the construction machine to travel along the travel route based on the position of the construction machine specified by the position measurement unit.

In the present invention, it is preferable that when the determination unit determines that the error in the position detected by the position detection unit is equal to or smaller than the predetermined error, the position measurement unit detects and stores a distance between the position detected by the position detection unit and the position of the construction machine obtained by comparing the detection result of the non-contact sensor and the map information of the travel route stored by the map information storage unit.

According to the present invention, a construction machine comprises: the construction machine control system; and a vehicle body that travels along a travel route provided in a mine.

According to the present invention, a construction machine management system comprises: the construction machine; and a management device that is disposed in a control facility provided in a mine and transmits information on a travel route provided in the mine to a construction machine control system of the construction machine.

According to the present invention, a construction machine control method for controlling a construction machine that travels along a travel route, comprises: allowing the construction machine to travel along the travel route based on a position of the construction machine detected using a position detection unit; extracting a detection result related to a vertical projection that protrudes vertically from a detection result of a non-contact sensor that detects a position of an object around the construction machine when an error in the detected position of the construction machine is equal to or smaller than a predetermined error; and storing the extracted detection result related to the vertical projection as map information of the travel route.

According to the present invention, provided is a program for causing a computer provided in a construction machine that travels along a travel route provided in a mine based on a position detected using a position detection unit to execute: determining whether an error in the position of the construction machine detected using the position detection unit is equal to or smaller than a predetermined error; and extracting a detection result related to a vertical projection from a detection result of a non-contact sensor that detects a position of an object around the construction machine when it is determined that the error in the detected position is equal to or smaller than the predetermined error and storing the extracted detection result related to the vertical projection in a map information storage unit as map information of the travel route.

According to the present invention, a decrease in the productivity of a mine is suppressed.

DESCRIPTION OF EMBODIMENTS

While embodiments of the present invention will be described with reference to the drawings, the present invention is not limited to these embodiments.

First Embodiment
<Overview of Construction Machine Management System>

Figure 1:
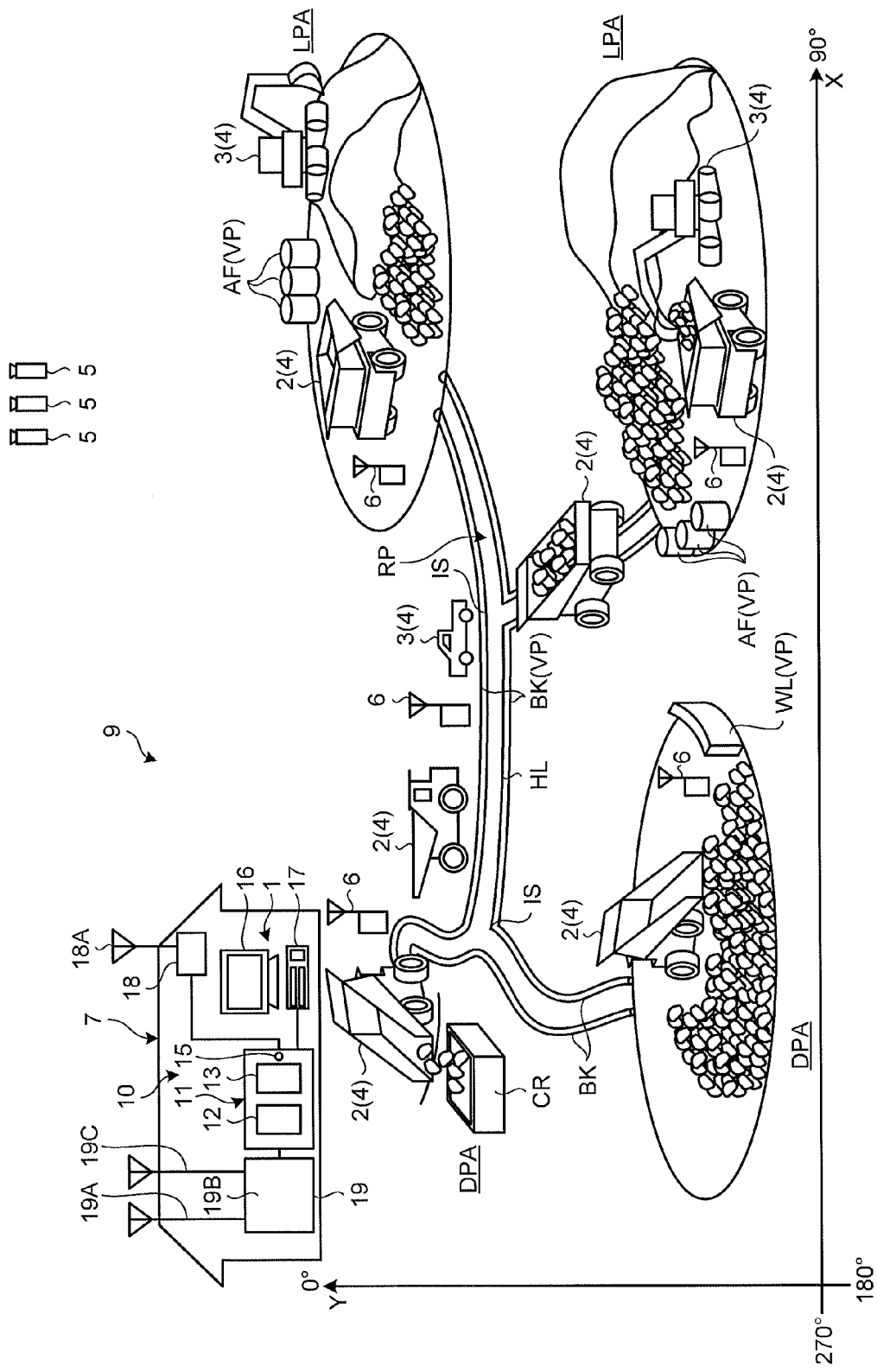
FIG. 1 is a diagram illustrating an example of a construction machine management system according to a first embodiment.

FIG. 1 is a diagram illustrating an example of a construction machine management system according to a first embodiment.

A construction machine management system 1 (hereinafter referred to as a management system) includes a management device 10 disposed in a control facility 7 and manages construction machines. Management of construction machines includes at least one of operations control of construction machines, the evaluation of productivity of the construction machines, the evaluation of operation skill of the construction machine operators, the maintenance of the construction machines, and the abnormality diagnosis of the construction machines.

The construction machine is a generic name of machinery used for various operations at a mine. Construction machines include at least one of a boring machine, an excavating machine, a loading machine, a transport machine, a crushing machine, and a vehicle that is driven by an operator. The excavating machines can excavate a mine. The loading machines can load loads the transport machine. The loading machines include at least one of an excavator, an electric shovel, and a wheel loader. The transport machine includes a moving body that can move at a mine, and can transport a load. The transport machines include a dump truck. The loads include at least one of soil and ores produced by excavation. The crushing machines crushes the dumped earth unloaded from the transport machines.

Figure 2:
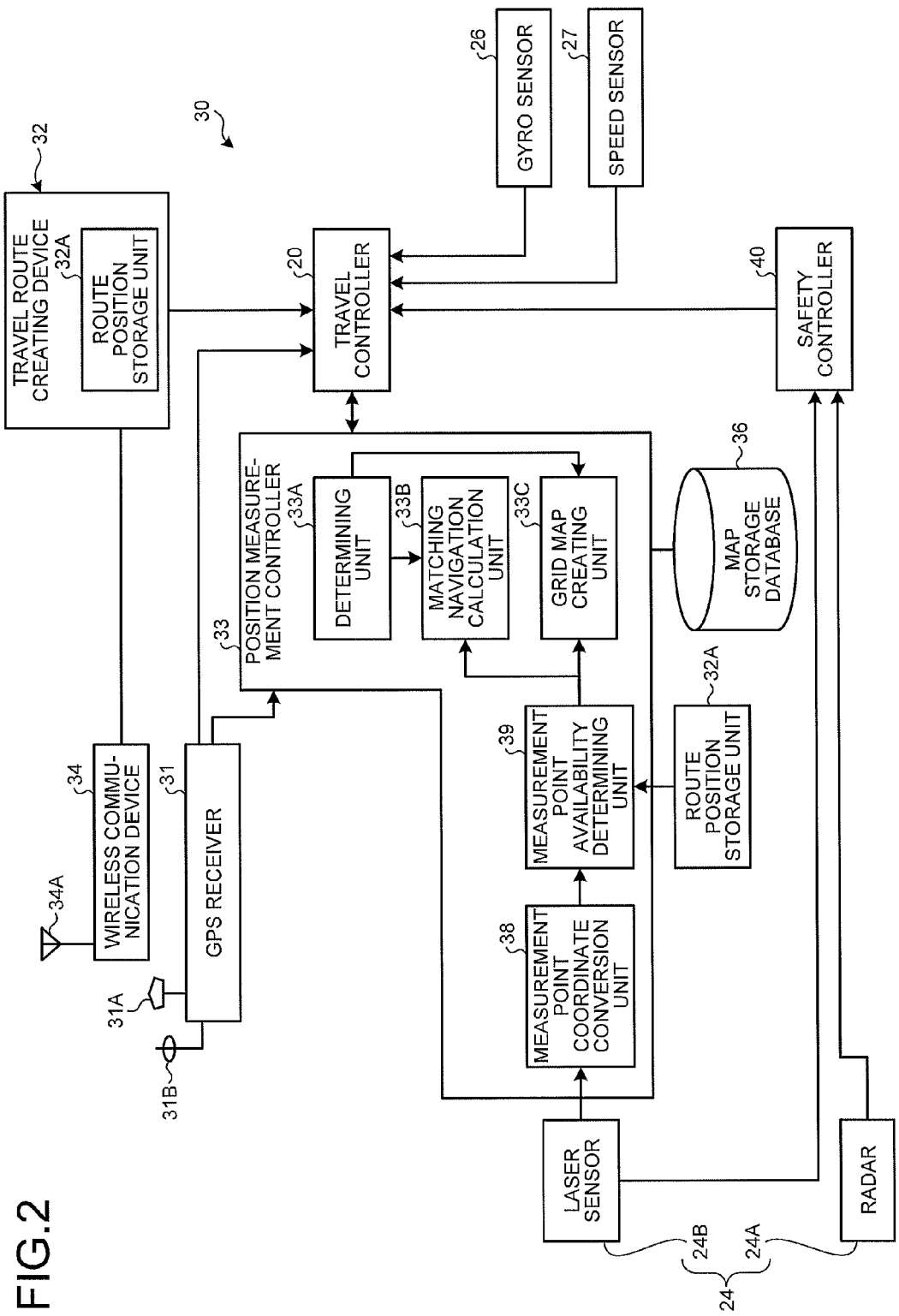
FIG. 2 is a control block diagram of a dump truck according to the first embodiment.

In the first embodiment, transport machines which are construction machines that travel in a mine are managed by the management system 1. In the first embodiment, an example in which dump trucks 2 which are the construction machines are managed by the management system 1 will be described. The dump truck 2 is a mining machine used in a mine and operates on at least a portion of a loading area LPA in a mine, a dumping area DPA, a haul road HL that leads to at least one of the loading area LPA and the dumping area DPA, and an intersection IS at which the haul roads HL cross each other as illustrated in FIGS. 1 and 2. A crushing machine CR that crushes the dumped earth may be disposed in at least one dumping area DPA. A bank BK in which earth is piled is provided in at least one of the outside of the loading area LPA, the outside of the dumping area DPA, and the outside of the haul road HL.

The dump truck 2 is a moving object that can move in a mine. The dump truck 2 can travel on at least a portion of the loading area LPA, the dumping area DPA, the haul road HL, and the intersection IS. The dump truck 2 can travel on at least a portion of the haul road HL and the intersection IS and can move between the loading area LPA and the dumping area DPA. That is, a travel route RP of the dump truck 2 provided in a mine includes at least a portion of the loading area LPA, the dumping area DPA, the haul road HL, and the intersection IS. Vertical projections VP that protrude by a predetermined height vertically from the surface of the travel route RP are disposed in a mine. In the first embodiment, the vertical projections VPs include the bank BK, an artificial object AF provided in at least one of the loading area LPA, the dumping area DPA, and the haul road HL, and a wall WL provided in at least one of the LPA, the dumping area DPA, and the haul road HL. However, the vertical projection VP may include signs, artificial objects such as a building, rocks, and the like. However, the vertical projection VP is not limited to this. The predetermined height is such a height that it is not desirable for the dump truck 2 to run over the vertical projection VP during autonomous travel.

The dump truck 2 can load loads in the loading area LPA. The loading area LPA is an area (place) where an operation of loading a load is performed in a mine. In the loading area LPA, a loading machine which is another construction machine 3 other than the dump truck 2 loads a load on the dump truck 2.

The dump truck 2 unloads (discharges) loads in the dumping area DPA. The dumping area DPA is an area (place) where an operation of discharging a load in a mine is performed. The dump truck 2 puts the dumped earth which is a load into a crushing machine CR in the dumping area DPA in which the crushing machine CR is provided.

In the first embodiment, the dump truck 2 is a so-called unmanned dump truck that generally autonomously travels along the travel route RP according to an instruction signal from a management device 10. The dump truck 2 does not travel according to an operation of an operator (driver). The dump truck 2 travelling autonomously unit that the dump truck 2 does not travel according to an operation of an operator but travels according to an instruction signal from the management device 10.

In FIG. 1, the management system 1 includes the management device 10 disposed in a control facility 7 to manage the dump truck 2, a communication system 9 capable of transmitting information, the dump truck 2, and the other construction machine 3.

The management device 10 is installed in the control facility 7 of the mine. The control facility 7 may be referred to as a management facility 7 or a central control room 7. The management device 10 may be referred to as a control device (central control device) 10 or a central control system 10. The management device 10 does not move. The management device 10 may be movable.

The communication system 9 delivers information according to wireless communication among the management device 10, the dump truck 2, and the other construction machine 3. The management device 10 and the dump truck 2 can perform bidirectional wireless communication via the communication system 9. The management device 10 and the other construction machine 3 can perform bidirectional wireless communication via the communication system 9. The dump truck 2 and the other construction machine 3 can perform bidirectional wireless communication via the communication system 9. In the first embodiment, the communication system 9 includes a plurality of relays 6 that relays signals (radio waves) among the management device 10, the dump truck 2, and the other construction machine 3.

In the first embodiment, the positions of the dump truck 2 and the other construction machine 3 are detected using a real time kinematic-global navigation satellite systems (RTK-GNSS; GNSS means global navigation satellite system). An example of the global navigation satellite system is a global positioning system (GPS) but not limited to this. The RTK-GNSS includes a plurality of positioning satellites 5. The RTK-GNSS detects a position in a coordinate system (a global coordinate system) that defines latitude, longitude, and altitude. The position detected by the RTK-GNSS includes coordinate data of latitude, longitude, and altitude. The positions of the dump truck 2 and the other construction machine 3 in a mine are detected by the RTK-GNSS. The positions detected by the RTK-GNSS are absolute positions defined in the global coordinate system. In the following description, the positions detected by the RTK-GNSS will be appropriately referred to as GPS positions. The GPS positions are absolute positions and are coordinate data (coordinate values) of latitude, longitude, and altitude. Moreover, according to the RTK-GNSS, a positioning state changes due to the influence of an arrangement of the positioning satellites 5, the ionosphere, the troposphere, or the geographical features around an antenna that received information from the positioning satellite 5. Examples of the positioning state include Fix solution (accuracy: approximately ±1 cm to 2 cm), Float solution (accuracy: approximately ±10 cm to several meters), Single solution (accuracy: approximately ± several meters), and No solution (Unable to compute a solution).

Moreover, the management system 1 manages the positions of the dump truck 2 and the other construction machine 3 in a mine using coordinates (hereinafter referred to as X-Y coordinates) defined in an X-axis direction and a Y-axis direction orthogonal to each other illustrated in FIG. 1. Moreover, the management system 1 manages the directions of the dump truck 2 and the other construction machine 3 using the North as 0°, the East as 90°, the South as 180°, and the West as 270°. The directions of the dump truck 2 and the other construction machine 3 are the directions in which the dump truck 2 and the other construction machine 3 move when travelling forward. In the first embodiment, although the Y-axis direction indicates the North, the present invention is not limited to this.

<Management Device>

Next, the management device 10 disposed in the control facility 7 will be described. The management device 10 is configured to transmit information on the travel route RP provided in a mine to a construction machine control system 30 of the dump truck 2. As illustrated in FIG. 1, the management device 10 includes a computer 11, a display device 16, an input device 17, a wireless communication device 18, and a GPS base station 19.

The computer 11 includes a processing device 12, a storage device 13, and an input and output unit 15. The display device 16, the input device 17, the wireless communication device 18, and the GPS base station 19 are connected to the computer 11 via the input and output unit 15. The input and output unit 15 is used for inputting and outputting (interfacing) information to and from at least one of the processing device 12, the display device 16, the input device 17, the wireless communication device 18, and the GPS base station 19.

The processing device 12 executes various processes related to the management of the dump truck 2 and the other construction machine 3. The processing device 12 processes the information on the positions of the dump truck 2 and the other construction machine 3, acquired via the communication system 9. The processing device 12 generates information on the travel route RP of the dump truck 2.

The storage device 13 is connected to the processing device 12. The storage device 13 stores various items of information related to the management of the dump truck 2 and the other construction machine 3. The storage device 13 stores the positions of the dump truck 2 and the other construction machine 3. The storage device 13 stores a computer program for causing the processing device 12 to execute various processes.

The display device 16 includes a flat panel display such as a liquid crystal display, for example. The display device 16 can display information on the positions of the dump truck 2 and the other construction machine 3.

The input device 17 includes at least one of a keyboard, a touch panel, and a mouse. The input device 17 functions as an operating unit that can input an operation signal to the processing device 12. An administrator of the control facility 7 can operate the input device 17 to input an operation signal to the processing device 12.

The wireless communication device 18 is disposed in the control facility 7. The wireless communication device 18 is a portion of the communication system 9. The wireless communication device 18 is connected to the processing device 12 via the input and output unit 15. The wireless communication device 18 has an antenna 18A. The wireless communication device 18 can receive information transmitted from at least one of the dump truck 2 and the other construction machine 3. The information received by the wireless communication device 18 is output to the processing device 12 and is stored (registered) in the storage device 13. The wireless communication device 18 can transmit information to at least one of the dump truck 2 and the other construction machine 3.

The GPS base station 19 is disposed in the control facility 7. The GPS base station 19 includes an antenna 19A that receives information from the plurality of positioning satellites 5 and a transceiver 19B connected to the antenna 19A. The transceiver 19B includes at least a receiver that receives information from the positioning satellite 5 via the antenna 19A, a transmitter that transmits information to the dump truck 2 via an antenna 19C, an arithmetic processor that includes a microprocessor such as a central processing unit (CPU), and a storage device that includes a memory such as read only memory (ROM) or random access memory (RAM). The transceiver 19B detects the GPS position of the GPS base station 19 from the information received by the antenna 19A and correction measurement information for correcting the GPS position of the dump truck 2. The transceiver 19B of the GPS base station 19 transmits the correction measurement information to the dump truck 2 and the other construction machine 3 via the antenna 19C.

The computer 11 includes at least a communication input and output unit 15, a central processing unit (CPU) that executes a control program, read only memory (ROM) that stores the control program, random access memory (RAM) that is used as a work area of the CPU, and nonvolatile memory in which information is registered by the CPU.

The function of the processing device 12 is realized when the CPU reads the control program stored in the ROM and executes the control program in the work area of the RAM. The function of the storage device 13 is realized when the ROM stores the control program and the information is stored in the nonvolatile memory by the CPU. The nonvolatile memory includes at least one of flash memory and a hard disk and realizes a database. Moreover, a plurality of processing circuits may realize the functions of the processing device 12 and the storage device 13 in collaboration.

<Other Construction Machine>

Next, the other construction machine 3 will be described. In the first embodiment, the other construction machine 3 is a construction machine other than the dump truck 2 and is driven by the operation of the operator. The other construction machine 3 includes a processing device that includes a central processing unit (CPU) and executes various processes related to operation content, a GPS receiver that detects the GPS position, and a wireless communication device that transmits and receives information to and from the wireless communication device 18 of the control facility 7. The wireless communication device of the other construction machine 3 transmits a GPS position to the wireless communication device 18 of the control facility 7 every predetermined period.

<Dump Truck>

Figure 3:
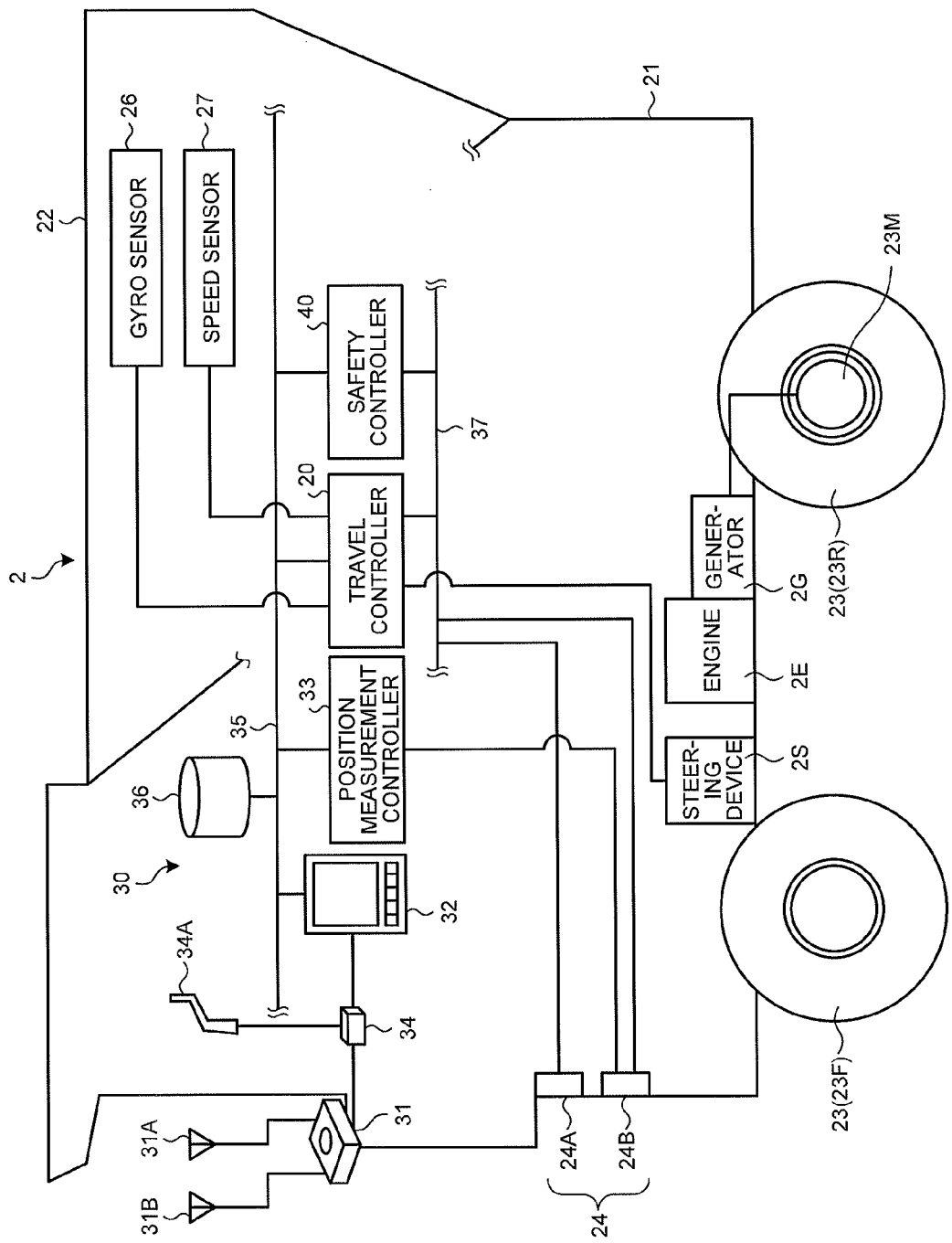
FIG. 3 is a hardware configuration diagram of the dump truck according to the first embodiment.
Figure 4:
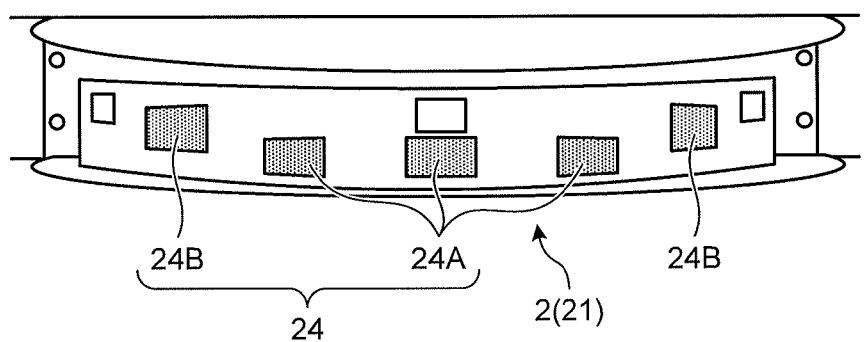
FIG. 4 is a front view of an obstacle sensor of the dump truck according to the first embodiment.
Figure 5:
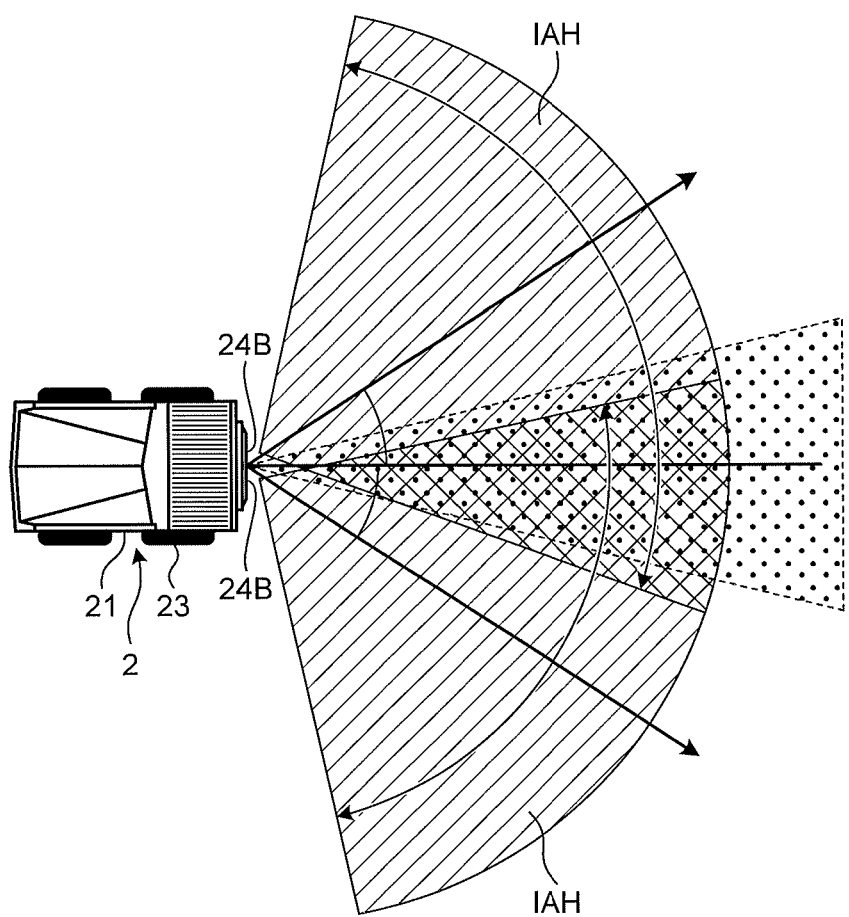
FIG. 5 is a plan view illustrating a detection range of a laser sensor of the obstacle sensor illustrated in FIG. 4.
Figure 6:
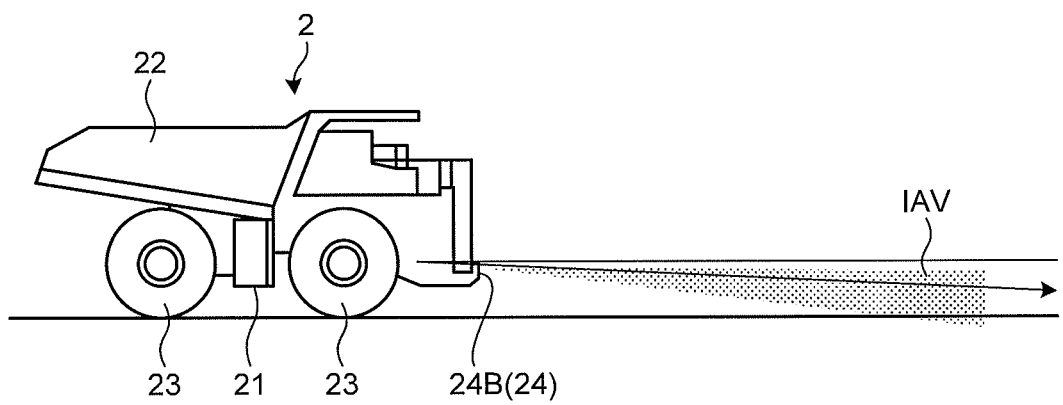
FIG. 6 is a side view illustrating a detection range of a laser sensor of the obstacle sensor of the dump truck illustrated in FIG. 4.

Next, the dump truck 2 will be described. FIG. 2 is a control block diagram of the dump truck according to the first embodiment. FIG. 3 is a hardware configuration diagram of the dump truck according to the first embodiment. FIG. 4 is a front view of an obstacle sensor of the dump truck according to the first embodiment. FIG. 5 is a plan view illustrating a detection range of a laser sensor of the obstacle sensor illustrated in FIG. 4. FIG. 6 is a side view illustrating the detection range of the laser sensor of the obstacle sensor of the dump truck illustrated in FIG. 4.

As illustrated in FIG. 3, the dump truck 2 includes a vehicle body 21, a vessel 22, wheels 23, an obstacle sensor 24, and a construction machine control system 30.

The vehicle body 21 is configured to travel along the travel route RP. An internal combustion engine 2E such as a diesel engine, a generator 2G operated by the internal combustion engine 2E, and a motor 23M operated by the electric power generated by the generator 2G are disposed in the vehicle body 21. Rear wheels 23R of the wheels 23 are driven by the motor 23M. The power of the internal combustion engine 2E may be transmitted to the rear wheels 23R via a transmission including a torque converter. Moreover, the vehicle body 21 includes a steering device 2S that steers front wheels 23F of the wheels 23. A loading machine loads a load on the vessel 22 and the vessel is lifted during a discharge operation to discharge the load.

As illustrated in FIG. 4, the obstacle sensor 24 is disposed under the front portion of the vehicle body 21. The obstacle sensor 24 detects an obstacle in front of the vehicle body 21 in a non-contacting manner. In the first embodiment, as illustrated in FIG. 4, the obstacle sensor 24 includes a plurality of radars 24A which is a non-contact sensor and a laser sensor 24B which is a non-contact sensor. The radar 24A is configured to detect the position of an object around the dump truck 2. The radar 24A emits radio waves to irradiate an obstacle with the radio waves and receives radio waves reflected from the obstacle. In this way, the radar 24A can detect the direction and the distance of the obstacle in relation to the radar 24A. In the first embodiment, although three radars 24A are provided at intervals in the left-right direction of the vehicle body 21, the present invention is not limited to this.

The laser sensor 24B is configured to detect the position of an object around the dump truck 2. The laser sensor 24B emits a laser beam to irradiate an obstacle which is an object with the laser beam and receives a laser beam reflected from the obstacle. In this way, the laser sensor 24B can detect the direction and the distance of the obstacle in relation to the laser sensor 24B. The resolution of the laser sensor 24B is higher than the resolution of the radar 24A because the laser sensor 24B emits a laser beam and receives the reflected laser beam. In the first embodiment, as illustrated in FIG. 4, although two laser sensors 24B are provided at an interval in the left-right direction of the vehicle body 21, the present invention is not limited to this.

The laser sensor 24B allows laser beams to oscillate in the left-right direction while emitting four laser beams having different directions in the up-down direction and receives laser beams reflected by an obstacle. In the first embodiment, although the two laser sensors 24B are configured such that the irradiation area IAH of laser beams overlap at the center in the left-right direction in a plan view of the vehicle body 21 as illustrated in FIG. 5, and the laser beams oscillate in the left-right direction, the present invention is not limited to this. Moreover, in the first embodiment, as illustrated in FIG. 6, although the laser sensor 24B irradiates laser beams in an irradiation area IAV about a direction inclined closer to a lower side than a horizontal direction from the vehicle body 21 in a side view of the vehicle body 21, the present invention is not limited to this.

Moreover, the radar 24A and the laser sensor 24B are connected to a second communication line 37 of the construction machine control system 30. Moreover, the laser sensor 24B is connected to a position measurement controller 33 of the construction machine control system 30.

<Construction Machine Control System>

Figure 7:
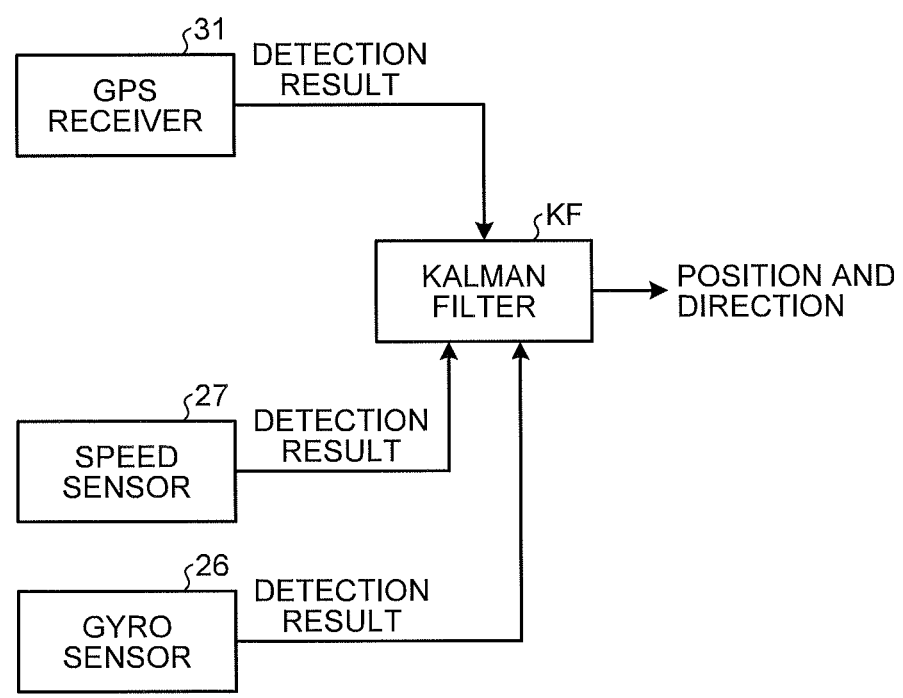
FIG. 7 is a diagram for describing a method by which a travel controller of the construction machine control system according to the first embodiment specifies a position and a direction.
Figure 8:
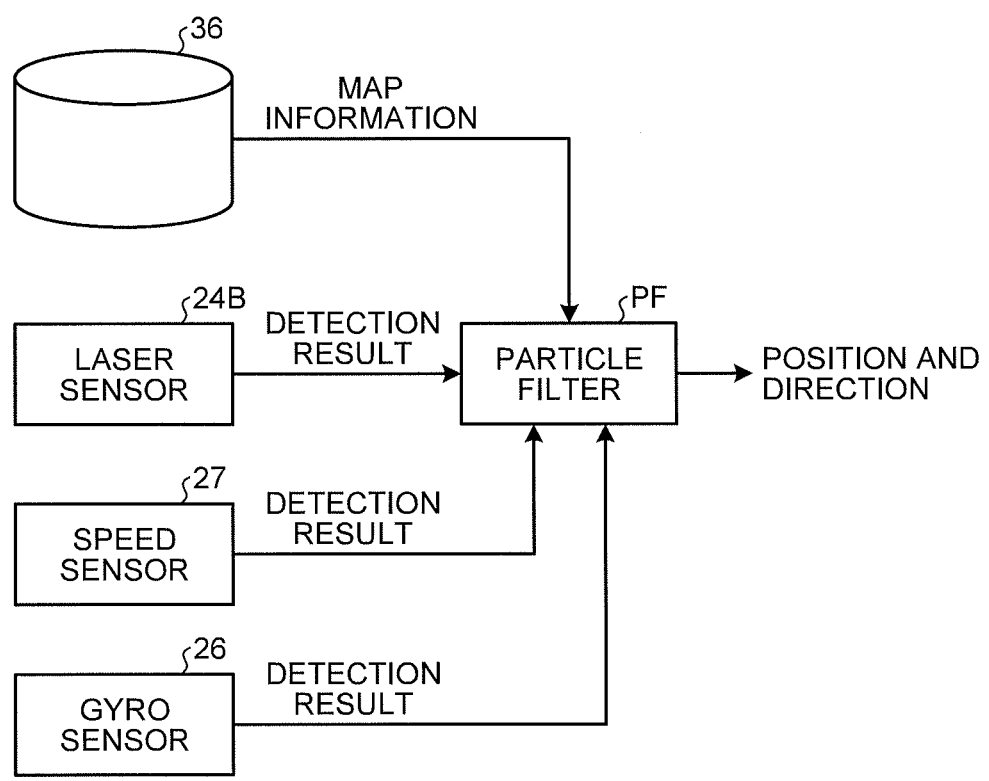
FIG. 8 is a diagram for describing a method by which a matching navigation calculation unit of a position measurement controller of the construction machine control system according to the first embodiment specifies a position and a direction.
Figure 9:
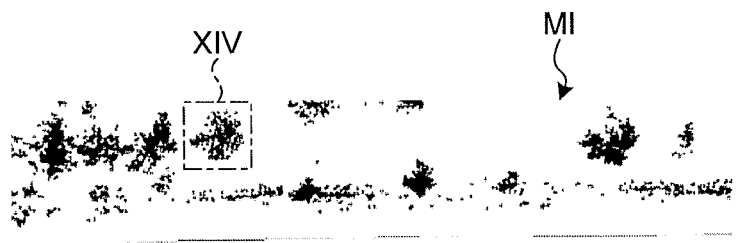
FIG. 9 is a diagram illustrating a portion of map information stored in a map storage database of the construction machine control system according to the first embodiment.
Figure 9:
Figure 10:
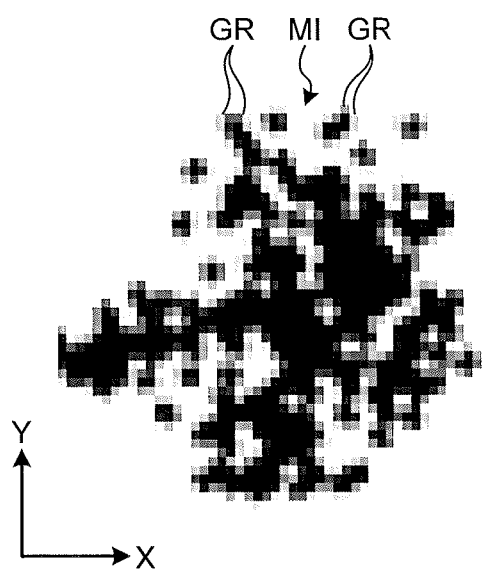
FIG. 10 is an enlarged view of a portion indicated by XIV in FIG. 9.

Next, the construction machine control system will be described. FIG. 7 is a diagram for describing a method by which the travel controller of the construction machine control system according to the first embodiment specifies a position and a direction. FIG. 8 is a diagram for describing a method by which a matching navigation calculation unit of the position measurement controller of the construction machine control system according to the first embodiment specifies a position and a direction. FIG. 9 is a diagram illustrating a portion of map information stored in a map storage database of the construction machine control system according to the first embodiment. FIG. 10 is an enlarged view of a portion indicated by XIV in FIG. 9.

The construction machine control system 30 is a system that is provided in the dump truck 2 so as to allow the dump truck 2 to autonomously travel along the travel route RP. As illustrated in FIG. 3, the construction machine control system 30 includes a gyro sensor 26, a speed sensor 27, a GPS receiver 31, a travel route creating device 32, a position measurement controller 33, a travel controller 20, the laser sensor 24B, a wireless communication device 34, and a map storage database 36. In addition to these components, the construction machine control system 30 further includes a first communication line 35, the second communication line 37, and a safety controller 40.

As illustrated in FIG. 3, the travel controller 20, the travel route creating device 32, the position measurement controller 33, the map storage database 36, and the safety controller 40 are connected to the first communication line 35. These components communicate with each other via the first communication line 35 to transmit and receive information. The travel controller 20 and the safety controller 40 are also connected to the second communication line 37. These components communicate with each other via the second communication line 37 to transmit and receive information. In the first embodiment, although the standard of the communication using the first and second communication lines 35 and 37 is CAN (controller area network) which is standardized as ISO 11898 and ISO 11519.

The gyro sensor 26 detects the direction (an amount of directional change) of the dump truck 2. The gyro sensor 26 is connected to the travel controller 20. The gyro sensor 26 outputs a detection signal which is a detection result to the travel controller 20. The travel controller 20 can calculate the direction (the amount of directional change) of the dump truck 2 based on the detection signal of the gyro sensor 26.

The speed sensor 27 detects a travel speed of the dump truck 2. In the first embodiment, the speed sensor 27 detects a rotation speed of the wheel 23 to detect the speed (travel speed) of the dump truck 2. The speed sensor 27 is connected to the travel controller 20. The speed sensor 27 outputs a detection signal which is a detection result to the travel controller 20. The travel controller can calculate the moving distance of the dump truck 2 based on the detection signal of the speed sensor 27 and time information calculated from a timer included in the travel controller 20.

The GPS receiver 31 is a position detection unit that detects the GPS position which is the position of the dump truck 2 using a GPS. The GPS receiver 31 is connected to at least one of an antenna 31A that receives information from the positioning satellite 5 and an antenna 31B that receives correction measurement information from the GPS base station 19. The antenna 31A outputs a signal based on the information received from the positioning satellite 5 to the GPS receiver 31, and the antenna 31B outputs a signal based on the received correction measurement information to the GPS receiver 31. The GPS receiver 31 detects the position (the GPS position) of the antenna 31A using the information from the positioning satellite 5 and the correction measurement information from the GPS base station 19. Specifically, the GPS receiver 31 compares the information from the positioning satellite 5 and the correction measurement information from the GPS base station 19 to calculate the distance to an arbitrary positioning satellite 5, and examines the phase of the radio waves from the positioning satellite 5 to detect the position (the GPS position) of the antenna 31A. In the first embodiment, although the GPS receiver 31 uses an RTK (real time kinematic)-GNSS, the present invention is not limited to this.

The GPS receiver 31 detects the position (the GPS position) of the dump truck 2 by detecting the position (the GPS position) of the antenna 31A. Moreover, the GPS receiver 31 detects a Fix solution, a Float solution, or a Single solution indicating the accuracy of the detected GPS position based on the number of the positioning satellites from which the antenna 31A has received information, for example, in the process of detecting the position of the antenna 31A. The GPS receiver 31 outputs a signal indicating No solution when the GPS position cannot be measured. In the first embodiment, when the accuracy of the GPS position is Fix solution, the dump truck 2 can perform autonomous travel whereas when the accuracy of the GPS position is Float or Single solution, the dump truck 2 cannot perform autonomous travel. However, the present invention is not limited to this. In this manner, the GPS receiver 31 detects the Fix, Float, or Single solution indicating the accuracy of the detected GPS position and outputs a signal indicating No solution when the GPS position cannot be measured to the travel controller 20 and the position measurement controller 33 via the travel route creating device 32.

As illustrated in FIG. 2, the travel route creating device 32 includes a route position storage unit 32A which is a route position storage unit that stores information on the travel route RP generated by the processing device 12 of the management device 10. The travel route creating device 32 is connected to the wireless communication device 34 to which an antenna 34A is connected. The wireless communication device 34 can receive information (including an instruction signal) transmitted from at least one of the management device 10 and the construction machine 4 other than a subject vehicle. The construction machine 4 other than the subject vehicle is a construction machine 4 other than the dump truck 2 in which the construction machine control system 30 is provided and includes a boring machine, an excavating machine, a loading machine, a transport machine, and a vehicle that is driven by an operator. That is, the construction machine 4 other than the subject vehicle includes the dump truck 2 other than the subject vehicle.

The wireless communication device 34 receives information on the travel route RP and information on the position of the construction machine 4 other than the subject vehicle transmitted by the wireless communication device 18 of the control facility 7 and outputs the information to the travel route creating device 32 and the position measurement controller 33. The information on the travel route RP and the information on the position of the construction machine 4 other than the subject vehicle are represented by X-Y coordinates. Upon receiving the information on the travel route RP and the information on the position of the construction machine 4 other than the subject vehicle from the wireless communication device 34, the travel route creating device 32 stores the information in the route position storage unit 32A. Upon receiving the information on the travel route RP and the information on the position of the construction machine 4 other than the subject vehicle from the wireless communication device 34, the travel route creating device 32 transmits the position and direction of the dump truck 2 which is the subject vehicle to the wireless communication device 18 of the control facility 7 via the wireless communication device 34. Moreover, the travel route creating device 32 is connected to the first communication line 35.

The travel controller 20 is a computer that includes at least a central processing unit (CPU), read only memory (ROM) that stores a control program, random access memory (RAM) used as a work area of the CPU, and nonvolatile memory. The travel controller 20 receives the GPS position detected by the GPS receiver 31 and the position of the dump truck 2 detected by the position measurement controller 33. The travel controller 20 is a control unit that allows the dump truck 2 to autonomously travel along the travel route RP based on the GPS position of the dump truck 2, detected by the GPS receiver 31 or the position of the dump truck 2, detected by a matching navigation calculation unit 33B of the position measurement controller 33.

The detection signal indicating the direction (the amount of directional change) of the dump truck 2, which is the detection result of the gyro sensor 26 other than the position of the dump truck 2 and the detection signal indicating the travel speed of the dump truck 2, which is the detection result of the speed sensor 27 are input to the travel controller 20. In the first embodiment, the detection signal indicating the direction (the amount of directional change) of the dump truck 2 and the detection signal indicating the travel speed of the dump truck 2, which is the detection result of the speed sensor 27 are input to the travel controller 20 every T1. Moreover, the travel controller 20 is connected to the GPS receiver 31 via the wireless communication device 34, the travel route creating device 32, and the first communication line 35. The detection signal indicating the GPS position which is the detection result of the GPS receiver 31 is input to the travel controller 20. In the first embodiment, the detection signal indicating the GPS position is input to the travel controller 20 every T2 that is longer than T1.

The travel controller 20 specifies the position and direction of the dump truck 2 based on the GPS position which is the detection result of the GPS receiver 31, the travel speed of the dump truck 2, which is the detection result of the speed sensor 27, and the direction (the amount of directional change) of the dump truck 2, which is the detection result of the gyro sensor 26. In the first embodiment, as illustrated in FIG. 7, the travel controller combines the GPS position which is the detection result of the GPS receiver 31, the travel speed of the dump truck 2, which is the detection result of the speed sensor 27, and the direction (the amount of directional change) of the dump truck 2, which is the detection result of the gyro sensor 26 using a Kalman filter KF to specify the position and direction of the dump truck 2. Specifically, the travel controller 20 integrates the travel speed which is the detection result of the speed sensor 27 by the time information from the timer based on the GPS position at the time at which the GPS position is input from the GPS receiver 31 and the direction which is the detection result of the gyro sensor 26 to specify the position and direction. The travel controller 20 converts the GPS position before, during, or after detection of the position and direction to the position in the X-Y coordinate.

The travel controller 20 controls at least one of the accelerator of the dump truck 2, a braking device (not illustrated), and a steering device 2S so that the position of the dump truck 2 overlaps the position of the travel route RP included in the travel route information (that is, the dump truck 2 travels along the travel route RP). According to such control, the travel controller 20 allows the dump truck 2 to travel along the travel route RP. The function of the travel controller 20 is realized when the CPU reads the control program stored in the ROM and executes the control program in a work area of the RAM. Moreover, a plurality of processing circuits may realize the function of the travel controller 20 in collaboration.

As illustrated in FIG. 2, the position measurement controller 33 includes a determining unit 33A, a matching navigation calculation unit 33B, and a grid map creating unit 33C. The position measurement controller 33 is configured to detect the GPS position of the dump truck 2, which is the detection result of the GPS receiver 31 and the position of the vertical projection VP (in the first embodiment, mainly the bank BK) from the detection result of the laser sensor 24B when the dump truck 2 travels along the travel route RP and stores the detected position of the vertical projection VP in the map storage database 36 as map information MI of the travel route RP. The position measurement controller 33 is connected to the first communication line 35. The detection signal indicating the direction (the amount of directional change) of the dump truck 2, which is the detection result of the gyro sensor 26 and the detection signal indicating the travel speed of the dump truck 2, which is the detection result of the speed sensor 27 are input to the position measurement controller 33 via the first communication line 35 and the travel controller 20.

Moreover, the position measurement controller 33 is connected to the GPS receiver 31 via the wireless communication device 34, the travel route creating device 32, and the first communication line 35. The detection signal indicating the GPS position which is the detection result of the GPS receiver 31 is input to the position measurement controller 33.

The determining unit 33A is a determination unit that determines whether an error in the GPS position detected by the GPS receiver 31 is equal to or smaller than a predetermined error. In the first embodiment, the determining unit 33A determines whether the solution of the GPS position is a Fix solution, and if the solution of the GPS position is the Fix solution, determines that the accuracy of the detected GPS position of the dump truck 2 is high and the error in the GPS position is equal to or smaller than a predetermined error. When the solution of the GPS position is a Float solution or a Single solution, or the GPS position is No solution, the determining unit 33A determines that the accuracy of the detected GPS position of the dump truck 2 is low and the error in the GPS position exceeds the predetermined error. The predetermined error is an error (accuracy) of the GPS position, in which the dump truck 2 can autonomously travel along the travel route RP according to dead reckoning described later. In the first embodiment, although the GPS receiver 31 detects the GPS position and the solution, the solution may be detected by another device (for example, the determining unit 33A).

When the determining unit 33A determines that the error in the GPS position of the dump truck 2, detected by the GPS receiver 31 is equal to or smaller than the predetermined error, the grid map creating unit 33C detects the position of the vertical projection VP (in the first embodiment, mainly the bank BK) provided in at least one of the loading area LPA, the dumping area DPA, and the haul road HL based on the detection result of the gyro sensor 26, the detection result of the speed sensor 27, and the detection result of the laser sensor 24B and stores information on the position of the vertical projection VP in the map storage database 36 as the map information MI of the travel route RP. Specifically, the grid map creating unit 33C combines the position and direction of the dump truck 2, detected by the travel controller 20 and the detection result of the laser sensor 24B and removes the detection result other than the vertical projection VP from the combined information to detect the position of the vertical projection VP. Moreover, the map information MI that the grid map creating unit 33C stores in the map storage database 36 indicates the X-Y coordinate positions of grids GR obtained by breaking a mine into quadrangles (rectangles or squares) of a predetermined size and whether the vertical projection VP is present in each grid GR in a plan view as illustrated in FIGS. 9 and 10. Each grid GR in the map information MI includes information on whether the vertical projection VP is present or not (that is, 0 or 1). In the first embodiment, as illustrated in FIGS. 9 and 10, although each grid GR in the map information MI is depicted as a black quadrangle in the figure to indicate "1" if the vertical projection VP is present or as a white quadrangle in the figure to indicate "0" if the vertical projection VP is not present, the present invention is not limited to this.

The map storage database 36 is a map information storage unit that stores information on the position of the vertical projection VP as the map information MI of the travel route RP and is connected to a first travel control CAN 35. The map storage database 36 is configured by at least one of random access memory (RAM), read only memory (ROM), flash memory, and a hard disk drive. When the determining unit 33A determines that the error in the GPS position of the dump truck 2, detected by the GPS receiver 31 is equal to or smaller than the predetermined error, the map storage database 36 extracts the detection result related to the vertical projection VP that protrudes vertically from the surface of the travel route RP from the detection result of the laser sensor 24B and stores the extracted detection result related to the vertical projection VP as the map information MI of the travel route RP. The map storage database 36 stores the detection result detected by the grid map creating unit 33C as the map information MI whenever the grid map creating unit 33C detects the detection result. In the first embodiment, although the map information MI stored in the map storage database 36 is overwritten whenever the grid map creating unit 33C detects the detection result, the present invention is not limited to this.

When the determining unit 33A determines that the error in the GPS position of the dump truck 2, detected by the GPS receiver 31 exceeds the predetermined error, the matching navigation calculation unit 33B specifies the position and direction of the dump truck 2 based on the detection result of the laser sensor 24B and the map information MI stored in the map storage database 36. As illustrated in FIG. 8, the matching navigation calculation unit 33B combines the detection result of the gyro sensor 26, the detection result of the speed sensor 27, the detection result of the laser sensor 24B, and the map information MI stored in the map storage database 36 using a particle filter PF to specify the position and direction of the dump truck 2. In the first embodiment, the matching navigation calculation unit 33B specifies the position and direction every T3 that is longer than T1 and shorter than T2 and outputs the specified position and direction to the travel controller 20. In the first embodiment, the position and direction detected by the matching navigation calculation unit 33B is input to the travel controller 20 every T3. As described above, the position measurement controller 33 is a position measurement unit that specifies the position of the dump truck 2 by comparing the detection result of the laser sensor 24B and the map information MI stored in the map storage database 36 when the determining unit 33A determines that the error in the GPS position of the dump truck 2 detected by the GPS receiver 31 exceeds the predetermined error.

Moreover, the position measurement controller 33 transmits information on the position and direction of the dump truck 2 which is the subject vehicle, detected by the GPS receiver 31 or the matching navigation calculation unit 33B to the wireless communication device 18 of the control facility 7 via the wireless communication device 34.

Further, as illustrated in FIG. 2, the position measurement controller 33 includes a measurement point coordinate conversion unit 38 and a measurement point availability determining unit 39. The measurement point coordinate conversion unit 38 converts the position of the detection result of the laser sensor 24B expressed using a coordinate that is defined by the direction and the distance from the laser sensor 24B to the X-Y coordinate. The position of the detection result which is coordinate-converted by the measurement point coordinate conversion unit 38 is defined by an X-axis direction, a Y-axis direction, and a height direction (a Z-axis direction) orthogonal to these directions. The information on the position of the construction machine 4 other than the subject vehicle is input from the route position storage unit 32A to the measurement point availability determining unit 39. The measurement point availability determining unit 39 removes various noise components, a detection result in which the height from the ground surface is equal to or lower than a predetermined height, and a detection result in which it is expected that the construction machine 4 other than the subject vehicle has been detected from the detection result which is coordinate-converted by the measurement point coordinate conversion unit 38. The measurement point availability determining unit 39 combines the detection result of the laser sensor 24B, from which noise components are removed with the detection result of the grids GR. The measurement point availability determining unit 39 outputs the combined detection result to both the grid map creating unit 33C and the matching navigation calculation unit 33B.

The position measurement controller 33 includes at least a communication input and output unit, a central processing unit (CPU) that executes a control program, read only memory (ROM) that stores the control program, random access memory (RAM) that is used as a work area of the CPU, and nonvolatile memory in which information is registered by the CPU.

The position measurement controller 33 is realized by a CPU, RAM, and ROM. The functions of the determining unit 33A, the matching navigation calculation unit 33B, the grid map creating unit 33C, the measurement point coordinate conversion unit 38, and the measurement point availability determining unit 39 are realized when the CPU reads the control program stored in the ROM and executes the control program in the work area of the RAM. The nonvolatile memory includes at least one of flash memory and a hard disk drive. Moreover, a plurality of processing circuits may realize the functions of the determining unit 33A, the matching navigation calculation unit 33B, the grid map creating unit 33C, the measurement point coordinate conversion unit 38, and the measurement point availability determining unit 39 in collaboration.

The safety controller 40 calculates a relative position between the dump truck 2 and an obstacle based on the detection signals of the radar 24A and the laser sensor 24B. The safety controller 40 generates an instruction for controlling at least one of an accelerator, a braking device (not illustrated), and the steering device 2S using the relative position to the obstacle and outputs the instruction to the travel controller 20. The travel controller 20 controls the dump truck 2 based on the instruction acquired from the safety controller 40 to avoid the dump truck 2 from colliding with the obstacle.

Moreover, the travel controller 20 outputs an instruction for controlling the braking device (not illustrated) that brakes the vehicle body 21 when the solution of the GPS position is the Float or Single solution or when a state in which the GPS position is not measured has continued a predetermined period and the matching navigation calculation unit 33B can only obtain the detection result of the laser sensor 24B in which the estimation accuracy and the reliability level of the map information MI stored in the map storage database 36 are lower than a predetermined value and a predetermined reliability level.

<Construction Machine Control Method>

Figure 11:
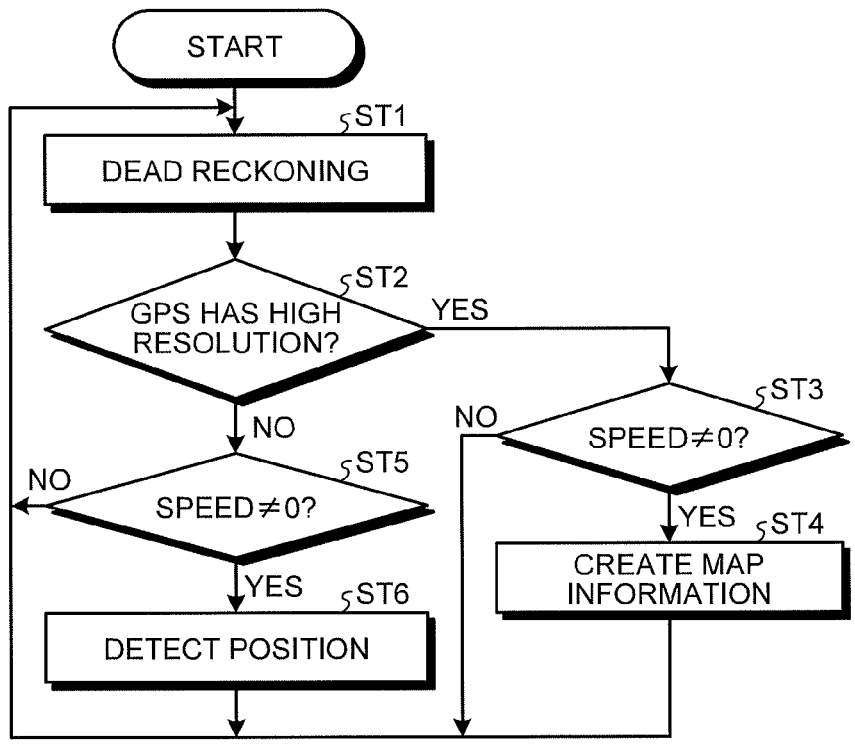
FIG. 11 is an example of a flowchart of the construction machine control system according to the first embodiment.
Figure 12:
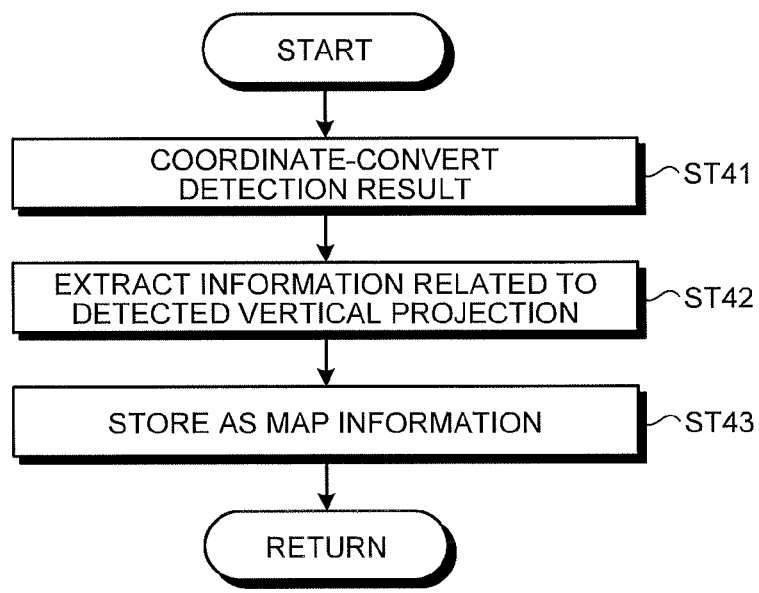
FIG. 12 is an example of the flowchart of step ST4 in FIG. 11.
Figure 13:
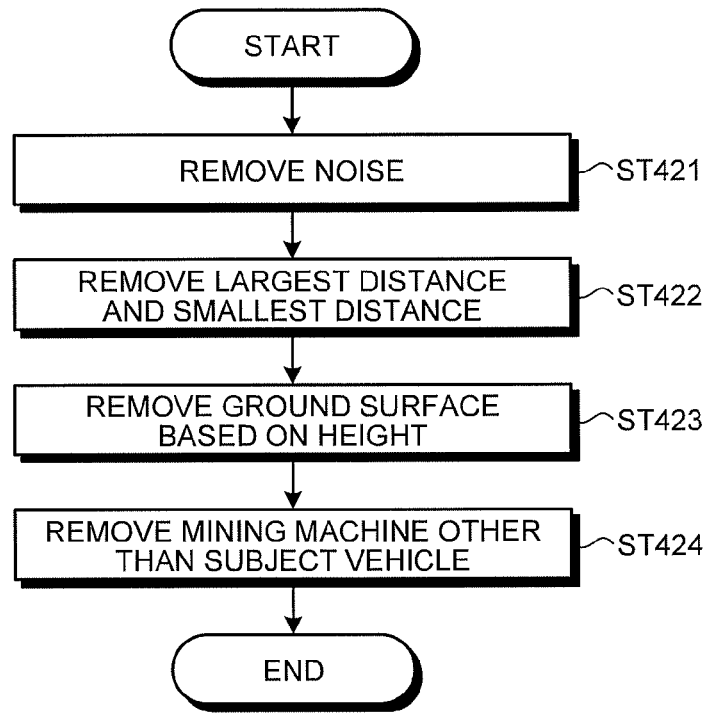
FIG. 13 is an example of the flowchart of step ST42 in FIG. 12.
Figure 14:
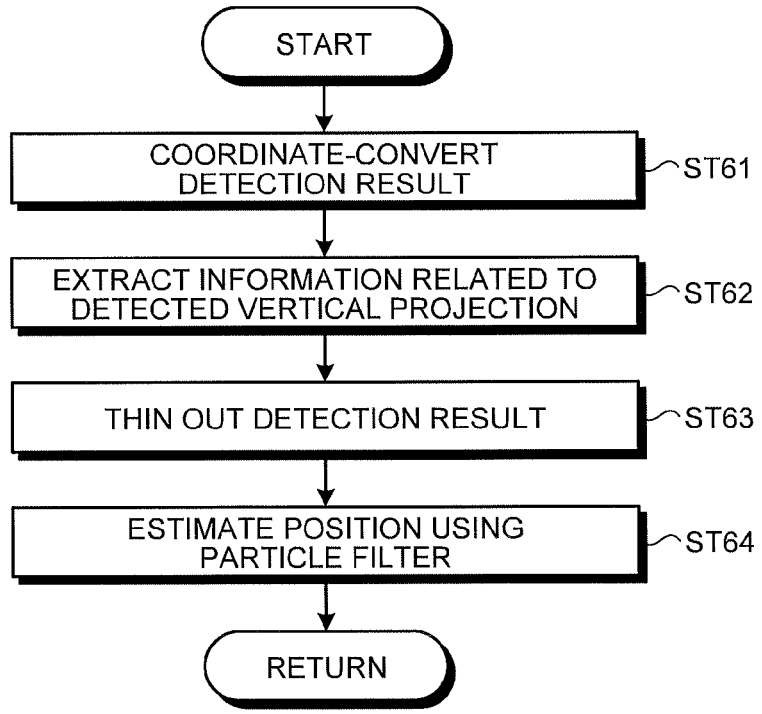
FIG. 14 is an example of the flowchart of step ST6 in FIG. 11.
Figure 15:
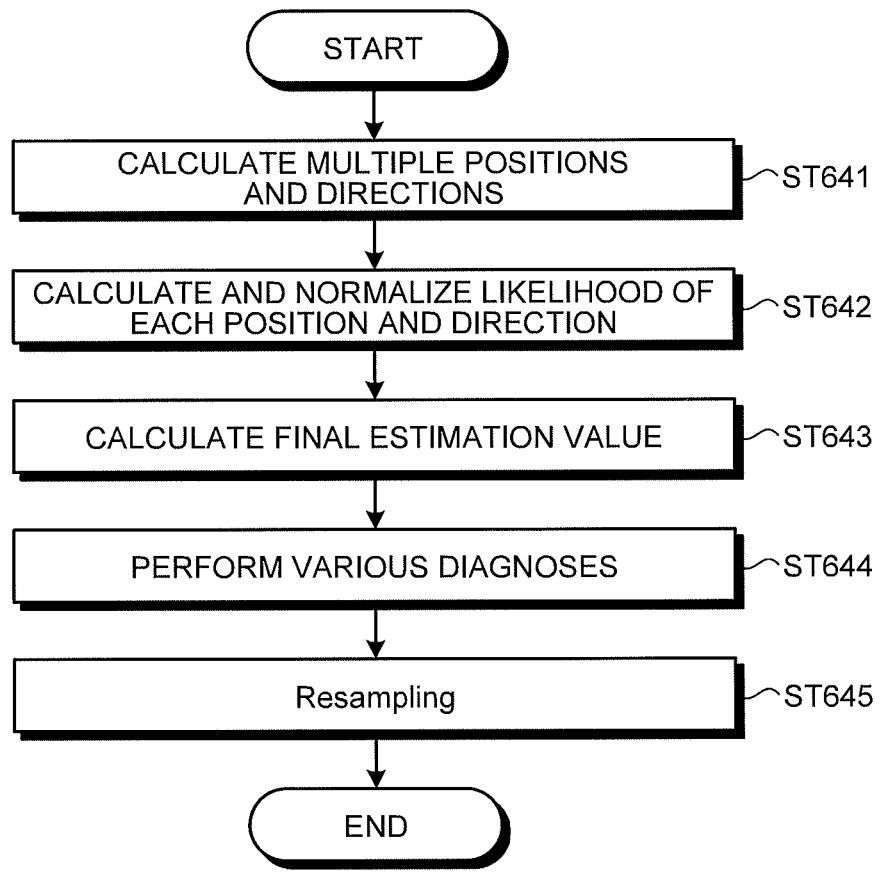
FIG. 15 is an example of the flowchart of step ST64 in FIG. 14.
Figure 16:
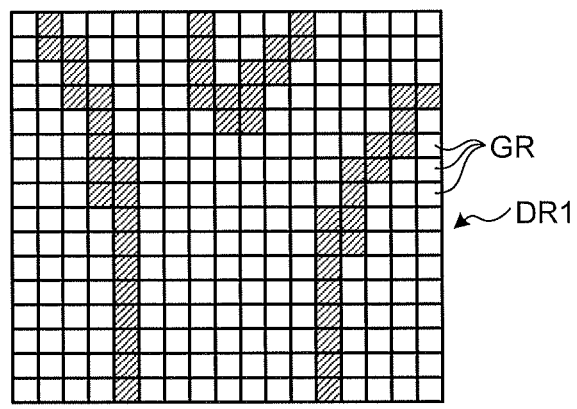
FIG. 16 is a diagram illustrating an example of an expected detection result of positions and directions detected by the matching navigation calculation unit of the construction machine control system according to the first embodiment.
Figure 17:
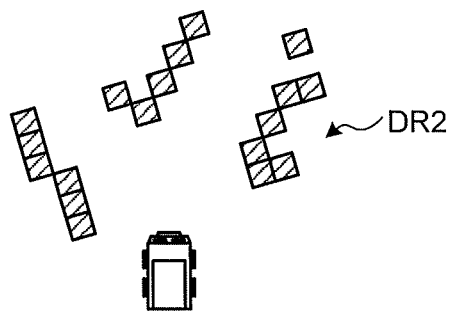
FIG. 17 is a diagram illustrating an example of a detection result actually detected by the laser sensor of the construction machine control system according to the first embodiment.
Figure 18:
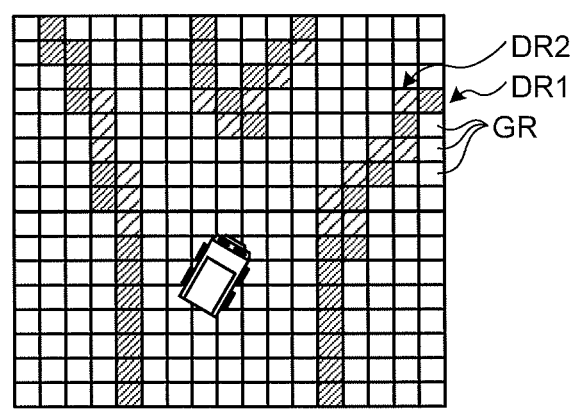
FIG. 18 is a diagram illustrating an example of a state in which the matching navigation calculation unit of the position measurement controller of the construction machine control system according to the first embodiment calculates the closest detection result.

Next, a construction machine control method according to the first embodiment (that is, an example of the operation of the construction machine control system 30) will be described. FIG. 11 is an example of the flowchart of the construction machine control system according to the first embodiment. FIG. 12 is an example of the flowchart of step ST4 in FIG. 11. FIG. 13 is an example of the flowchart of step ST42 in FIG. 12. FIG. 14 is an example of the flowchart of step ST6 in FIG. 11. FIG. 15 is an example of the flowchart of step ST64 in FIG. 14. FIG. 16 is a diagram illustrating an example of an expected detection result of positions and directions detected by the matching navigation calculation unit of the construction machine control system according to the first embodiment. FIG. 17 is a diagram illustrating an example of a detection result actually detected by the laser sensor of the construction machine control system according to the first embodiment. FIG. 18 is a diagram illustrating an example of a state in which the matching navigation calculation unit of the position measurement controller of the construction machine control system according to the first embodiment calculates the closest detection result.

The construction machine control method is a method by which the construction machine control system 30 allows the dump truck 2 to autonomously travel along the travel route RP. In the construction machine control method, the processing device 12 transmits an instruction signal to the travel route creating device 32 and the position measurement controller 33 of the dump truck 2 via the wireless communication device 18. The instruction signal includes information on the travel condition of the dump truck 2 and information on the position of the construction machine 4 other than the subject vehicle. The information on the travel condition includes the information on the travel route RP generated by the processing device 12 and the information on the travel speed of the dump truck 2.

The travel route creating device 32 stores the information on the travel route RP and the information on the position of the construction machine 4 other than the subject vehicle among the instruction signals transmitted from the processing device 12 via the communication system 9 in the route position storage unit 32A. When the travel route creating device 32 receives the instruction signal from the processing device 12, including the information on the travel route RP, the position measurement controller 33 transmits information on the position and direction of the dump truck 2 which is the subject vehicle to the processing device 12 via the wireless communication device 34. The travel controller 20 controls the accelerator of the dump truck 2, the braking device (not illustrated), and the steering device 2S based on the instruction signal from the processing device 12 to control the travel of the dump truck 2.

The travel controller 20 of the construction machine control system 30 executes step ST1 of allowing the dump truck 2 to travel according to dead reckoning along the travel route RP based on the GPS position of the dump truck 2, detected by the GPS receiver 31. In the first embodiment, the travel controller 20 allows the dump truck 2 to travel in at least a portion of the loading area LPA, the dumping area DPA, the haul road HL, and the intersection IS according to the travel condition including the information on the travel route RP generated by the processing device 12 of the management device 10 and the travel speed (a target travel speed) set by the processing device 12. The dead reckoning means a navigation method of predicting the present position of an object (the dump truck 2) based on the direction (the amount of directional change) and the moving distance from a known position. The direction (the amount of directional change) of the dump truck 2 is detected using the gyro sensor 26 disposed in the dump truck 2. The moving distance of the dump truck 2 is detected using the speed sensor 27 disposed in the dump truck 2. The detection signal of the gyro sensor 26 and the detection signal of the speed sensor 27 are output to the travel controller 20 of the dump truck 2.

The travel controller 20 can calculate the direction (the amount of directional change) of the dump truck 2 from a known start point based on the detection signal from the gyro sensor 26. The travel controller 20 can calculate the moving distance of the dump truck 2 from the known start point based on the detection signal from the speed sensor 27. The travel controller 20 generates a control amount related to the travel of the dump truck 2 based on the detection signal from the gyro sensor 26 and the detection signal from the speed sensor 27 so that the dump truck 2 travels along the generated travel route RP. The control amount includes an accelerator signal, a braking signal, and a steering signal. The travel controller 20 controls the travel (operation) of the dump truck 2 based on the steering signal, the accelerator signal, and the braking signal.

Next, an example in which the dump truck 2 travels while the prediction position calculated by dead reckoning is corrected using the RTK-GNSS or the matching navigation calculation unit 33B. When the travel distance of the dump truck 2 increases, a difference may occur between the predicted position (prediction position) and the actual position due to an accumulated detection error in one or both of the gyro sensor 26 and the speed sensor 27. As a result, the dump truck 2 may travel off the travel route RP generated by the processing device 12. In the first embodiment, the travel controller 20 allows the dump truck 2 to travel while correcting the position (the prediction position) of the dump truck 2 derived (predicted) according to dead reckoning using the GPS position detected by the GPS receiver 31 or the position detected by the matching navigation calculation unit 33B. The travel controller 20 calculates a control amount related to the travel of the dump truck 2, including a correction amount for correcting the position of the dump truck 2 based on the detection signal from the gyro sensor 26, the detection signal from the speed sensor 27, the GPS position from the GPS receiver 31, or the position detected by the matching navigation calculation unit 33B so that the dump truck 2 travels along the travel route RP. The travel controller 20 controls the travel (operation) of the dump truck 2 based on the calculated correction amount and control amount so that the dump truck 2 travels along the travel route RP.

Subsequently, the determining unit 33A of the position measurement controller 33 executes step ST2 of determining whether an error in the GPS position of the dump truck 2, detected by the GPS receiver 31 is equal to or smaller than a predetermined error. That is, in step ST2, the determining unit 33A of the position measurement controller 33 determines whether the accuracy of the GPS position of the dump truck 2, detected by the GPS receiver 31 is high. Specifically, the determining unit 33A of the position measurement controller 33 determines whether the solution of the GPS position detected by the GPS receiver 31 is the Fix solution. When it is determined that the solution of the GPS position detected by the GPS receiver 31 is the Fix solution (that is, the error in the GPS position of the dump truck 2, detected by the GPS receiver 31 is equal to or smaller than the predetermined error) (step ST2: Yes), the determining unit 33A of the position measurement controller 33 determines whether the travel speed of the dump truck 2 is 0 based on the detection signal of the speed sensor 27 (that is, whether the dump truck 2 is in a stopped state) (step ST3).

When the determining unit 33A of the position measurement controller 33 determines that the travel speed of the dump truck 2 is not 0 (that is, the dump truck 2 is not in the stopped state) (step ST3: Yes), the grid map creating unit 33C creates the map information MI (step ST4). That is, when it is determined that the error in the GPS position detected by the GPS receiver 31 is equal to or smaller than the predetermined error, the position measurement controller 33 executes step ST4 of extracting a detection result related to the vertical projection VP from the detection result of the laser sensor 24B and storing the detection result related to the vertical projection VP in the map storage database 36 as the map information MI of the travel route RP. Specifically, first, the measurement point coordinate conversion unit 38 converts the position of the detection result of the laser sensor 24B expressed using a coordinate that is defined by the direction and the distance from the laser sensor 24B to a coordinate position expressed by the X-Y coordinate (step ST41).

The measurement point availability determining unit 39 extracts a detection result related to the vertical projection VP from the detection result which is coordinate-converted by the measurement point coordinate conversion unit 38 (step ST42). When the detection result related to the vertical projection VP is extracted, first, the measurement point availability determining unit 39 removes various noise components from the detection result which is coordinate-converted by the measurement point coordinate conversion unit 38 (step ST421). Specifically, the measurement point availability determining unit 39 removes a detection result in which reflection intensity is low, a detection result in which it is considered that a laser beam has passed through a transparent object, a detection result in which it is considered that a laser beam has detected dust, a detection result in which it is considered that a laser beam has been reflected, and a detection result in which it is considered that a laser beam has detected a lump of earth on the ground surface from the detection result which is coordinate-converted by the measurement point coordinate conversion unit 38 as noise components.

The measurement point availability determining unit 39 removes a detection result in which the distance is equal to or larger than a predetermined largest distance and a detection result in which the distance is equal to or smaller than a predetermined smallest distance from the detection result which is coordinate-converted by the measurement point coordinate conversion unit 38 (step ST422). In the first embodiment, the predetermined largest distance is the distance necessary for removing noise components resulting from the sunlight and the predetermined smallest distance is the distance for removing noise components of dense dust generated at a short distance from the laser sensor 24B.

The measurement point availability determining unit 39 removes a detection result in which the height from the ground surface is equal to or smaller than a predetermined height from the detection result which is coordinate-converted by the measurement point coordinate conversion unit 38 (step ST423). In the first embodiment, although the measurement point availability determining unit 39 removes the detection result in which the height is equal to or smaller than the predetermined height, the present invention is not limited to this. The measurement point availability determining unit 39 removes a detection result in which it is expected that the construction machine 4 other than the subject vehicle has been detected from the detection result which is coordinate-converted by the measurement point coordinate conversion unit 38 by referring to the information on the position of the construction machine 4 other than the subject vehicle stored in the route position storage unit 32A (step ST424). In this manner, the measurement point availability determining unit 39 extracts the detection result related to the vertical projection VP from the detection result by removing various noise components or the like from the detection result. By the process of step ST424, the detection result of the laser sensor 24B can be reduced by approximately ⅕ to ⅙ as compared to before processing.

The measurement point availability determining unit 39 combines the detection result in which various noise components or the like are removed with a detection result in which the position is expressed by the X-Y coordinate and which is formed of grids GR of a predetermined size. The measurement point availability determining unit 39 outputs the combined detection result to both the grid map creating unit 33C and the matching navigation calculation unit 33B. The grid map creating unit 33C of the position measurement controller 33 stores the position of the vertical projection VP, which is the detection result combined by the measurement point availability determining unit 39 in the map storage database 36 as the map information MI of the travel route RP (step ST43). As described above, the ROM of the position measurement controller 33 stores a program for causing the position measurement controller 33 which is a computer to execute steps ST2 and ST4. Moreover, the construction machine control method executes steps ST1 to ST4 to thereby extract the detection result related to the vertical projection VP from the detection result of the laser sensor 24B and store the extracted detection result related to the vertical projection VP as the map information MI of the travel route RP when the error in the GPS position of the dump truck 2 detected by the GPS receiver 31 is equal to or smaller than the predetermined error.

When the determining unit 33A of the position measurement controller 33 determines that the travel speed of the dump truck 2 is 0 (that is, the dump truck 2 is in a stopped state) (step ST3: No), the flow returns to step ST1. The determining unit 33A returns to step ST1 when the travel speed of the dump truck 2 is 0 (step ST3: No) whereby the map storage database 36 stops storing the map information MI of the travel route RP when the speed sensor 27 detects a stopped state of the dump truck 2. This is because, when the dump truck 2 of which the travel speed is 0 is in a stopped state, noise components may be mixed into the map information MI due to dust or the like generated during operation of the construction machine 4 other than the subject vehicle and the accuracy of the map information MI may decrease.

Moreover, when it is determined that the solution of the GPS position detected by the GPS receiver 31 is not the Fix solution (that is, it is determined that the error in the GPS position of the dump truck 2 detected by the GPS receiver 31 exceeds the predetermined error) (step ST2: No), the determining unit 33A of the position measurement controller 33 determines whether the travel speed of the dump truck 2 is 0 based on the detection signal of the speed sensor 27 (that is, whether the dump truck 2 is in a stopped state) (step ST5).

When the determining unit 33A of the position measurement controller 33 determines that the travel speed of the dump truck 2 is not 0 (that is, the dump truck 2 is not in the stopped state) (step ST5: Yes), the matching navigation calculation unit 33B specifies the position and direction of the dump truck 2 based on the detection result of the laser sensor 24B and the map information MI stored in the map storage database 36, and the travel controller allows the dump truck 2 to travel along the travel route RP (step ST6). That is, when the determining unit 33A determines that the error in the GPS position detected by the GPS receiver 31 exceeds the predetermined error, the position measurement controller 33 specifies the position and direction of the dump truck 2 by comparing the detection result of the laser sensor 24B and the map information MI stored in the map storage database 36. Moreover, the travel controller 20 allows the dump truck 2 to travel along the travel route RP based on the position detected by the matching navigation calculation unit 33B of the position measurement controller 33.

Specifically, the measurement point coordinate conversion unit 38 converts the position of the detection result of the laser sensor 24B expressed by a coordinate that is defined by the direction and the distance from the laser sensor 24B to the X-Y coordinate position (step ST61). The measurement point availability determining unit 39 extracts a detection result related to the vertical projection VP from the detection result which is coordinate-converted by the measurement point coordinate conversion unit 38 (step ST62). Since step ST61 is the same process as step ST41 and step ST62 is the same process as step ST42, the detailed description thereof will be omitted.

The matching navigation calculation unit 33B thins out the detection result by passing the detection result in which the noise components are removed by the measurement point availability determining unit 39 through an isolation filter (step ST63). Specifically, the matching navigation calculation unit 33B leaves only detection results which are separated by a predetermined distance or more among the detection results in which the noise components are removed by the measurement point availability determining unit 39 and removes the other detection results. By the process of step ST63, the detection result of the laser sensor 24B can be reduced by approximately ⅕ to ⅙ as compared to before processing.

The matching navigation calculation unit 33B combines the detection result of the gyro sensor 26, the detection result of the speed sensor 27, the detection result of the laser sensor 24B, and the map information MI stored in the map storage database 36 using a particle filter PF to specify the position and direction of the dump truck 2 (step ST64). Specifically, the matching navigation calculation unit 33B calculates a plurality of positions and directions within a range in which it is expected that the dump truck 2 is present at a certain time point based on the direction which is the detection result of the gyro sensor 26 and the travel speed which is the detection result of the speed sensor 27 (step ST641).

As illustrated in FIG. 16, the matching navigation calculation unit 33B estimates a detection result that the laser sensor 24B is expected to detect when the dump truck 2 is positioned at each of expected positions and directions based on the map information MI stored in the map storage database 36. The matching navigation calculation unit 33B compares a detection result DR1 that the laser sensor 24B is expected to detect at each position and direction, illustrated as an example in FIG. 16 and a detection result DR2 that the laser sensor 24B has actually detected, illustrated in FIG. 17 to calculate the likelihood of the detection result DR1 that the laser sensor 24B is expected to detect at each position and direction to the detection result DR2 that the laser sensor 24B has actually detected. The matching navigation calculation unit 33B normalizes the likelihood at each position and direction (step ST642).

The matching navigation calculation unit 33B calculates a final estimation value from the respective positions and the likelihood of the detection result DR1 that the laser sensor 24B is expected to detect at each position and direction and calculates a position and a direction at which the detection result DR1 that the laser sensor 24B is expected to detect is most similar to the detection result DR2 that the laser sensor 24B has actually detected as illustrated in FIG. 18. The matching navigation calculation unit 33B detects the most similar position and direction as the position and direction of the dump truck 2. When the most similar position and direction are calculated, the matching navigation calculation unit 33B calculates the estimation accuracy and the reliability of the most similar position and direction (step ST643). FIGS. 16 and 18 illustrate the grids GR in which the vertical projection VP is present by dense oblique hatched lines and FIG. 17 illustrates the detection result of the vertical projection VP by coarse oblique hatched lines. Although FIG. 18 illustrates an example which the detection result DR2 that the laser sensor 24B has actually detected is a portion of the detection result DR1, the present invention is not limited to this.

The matching navigation calculation unit 33B performs various diagnoses at the detected position and direction of the dump truck 2 (step ST644). Specifically, when the detected position and direction of the dump truck 2 are detected from the detection result detected during a failure in the laser sensor 24B, from the detection result detected during a failure in the gyro sensor 26, or from a number of detection results of the laser sensor 24B smaller than a predetermined number, the reliability is lower than a predetermined reliability, the likelihood is lower than a predetermined value, the estimation accuracy is lower than a predetermined value, a shift from the position and direction obtained by dead reckoning is larger than a predetermined value, or the detected position and direction are detected using wrong map information MI, the matching navigation calculation unit 33B discards the detected position and direction of the dump truck 2 and calculates a plurality of positions and directions within a range in which it is expected that the dump truck 2 is present at a certain time point again (step ST645). The plurality of calculated positions and directions are used as a plurality of positions and directions calculated in step ST641 when step ST6 is executed later.

Moreover, the detected position and direction of the dump truck 2 are not detected from the detection result detected during a failure in the laser sensor 24B, from the detection result detected during a failure in the gyro sensor 26, or from a number of detection results of the laser sensor 24B smaller than a predetermined number, the reliability is not lower than a predetermined reliability, the likelihood is not lower than a predetermined value, the estimation accuracy is not lower than a predetermined value, a shift from the position and direction obtained by dead reckoning is not larger than a predetermined value, and the detected position and direction are not detected using wrong map information MI, the matching navigation calculation unit 33B executes the dead reckoning (step ST1) using the detected position and direction and the position measurement controller 33 controls the travel (operation) of the dump truck 2 so that the dump truck 2 travels along the travel route RP.

When the determining unit 33A of the position measurement controller 33 determines that the travel speed of the dump truck 2 is 0 (that is, the dump truck 2 is in a stopped state) (step ST5: No), the flow returns to step ST1. The determining unit 33A returns to step ST1 when the travel speed of the dump truck 2 is 0 (step ST5: No) whereby the position measurement controller 33 stops specifying the position and direction of the dump truck 2 by comparing the detection result of the laser sensor 24B and the map information MI of the travel route RP stored in the map storage database 36 when the speed sensor 27 detects a stopped state of the dump truck 2. This is because, when the dump truck 2 of which the travel speed is 0 is in a stopped state, noise components may be mixed into the detection result of the laser sensor 24B due to dust or the like generated during operation of the construction machine 4 other than the subject vehicle and the position measurement accuracy of the matching navigation calculation unit 33B may decrease. Moreover, this is because the position of the dump truck 2 does not change when the dump truck 2 of which the travel speed is 0 is in a stopped state.

In the first embodiment, when the solution of the GPS position detected by the GPS receiver 31 is the Fix solution, the construction machine control system 30, the construction machine control method, and the program stored in the position measurement controller 33 create the map information MI composed of the position of the vertical projection VP based on the detection result of the laser sensor 24B and stores the map information MI in the map storage database 36 while allowing the dump truck 2 to autonomously travel along the travel route RP based on the GPS position and the like. As a result, the accuracy of the map information MI is improved. Thus, even when it is not possible to specify the position and direction using a GPS, the construction machine control system 30 can allow the dump truck 2 to travel along the travel route RP by specifying the position and direction of the subject vehicle based on the map information MI having improved accuracy and the detection result of the laser sensor 24B. Moreover, the construction machine control system 30 can allow the dump truck 2 to travel continuously (that is, the operations of the mine can be performed continuously).

Moreover, since the construction machine control system 30 stops storing the map information MI in a period in which the dump truck 2 is in a stopped state, it is possible to suppress the noise components from being included in the map information MI stored in the map storage database 36.

As a result, even when it is not possible to specify the position and direction using a GPS, since the construction machine control system 30 can specify the position and direction of the subject vehicle based on the map information MI with small noise, the dump truck 2 can continue travel (that is, the operations in a mine can be continuously performed).

When the solution of the GPS position detected by the GPS receiver 31 is not the Fix solution, the construction machine control system 30 according to the first embodiment compares the detection result of the laser sensor 24B and the map information MI stored in the map storage database 36 to specify the position and direction of the dump truck 2. As a result, even when it is not possible to specify the position and direction using a GPS, the construction machine control system 30 can specify the position and direction based on the detection result of the laser sensor 24B which provides higher resolution than the radar 24A and the map information MI. Thus, the dump truck 2 can travel continuously (that is, the operations of the mine can be performed continuously).

The construction machine control system 30 stops specifying the position and direction of the dump truck 2 by comparing the detection result of the laser sensor 24B and the map information MI stored in the map storage database 36 in a period in which the dump truck 2 is in a stopped state. As a result, the construction machine control system 30 can suppress the position and direction of the dump truck 4 from being updated unnecessarily during stopping.

In the first embodiment, since the dump truck 2 and the management system 1 include the construction machine control system 30, the map information MI composed of the position of the vertical projection VP is stored in the map storage database 36 when the solution of the GPS position detected by the GPS receiver 31 is the Fix solution. Thus, since it is possible to specify the position and direction of the subject vehicle using the map information MI even when it is not possible to specify the position and direction using a GPS, the dump truck 2 can travel continuously (that is, the operations of the mine can be performed continuously).

Moreover, the construction machine control system can decrease the amount of information of the entire map information MI since the grids GR of the map information MI are composed of information indicating whether the vertical projection VP is present or not (that is, 0 or 1). As a result, the construction machine control system 30 can specify the position of the dump truck 2 in realtime even when the position measurement controller 33 provided in the dump truck 2 has a limited processing capability. Moreover, even when it is not possible to specify the position and direction using a GPS, the construction machine control system 30 can allow the dump truck 2 to travel continuously (that is, the operations of the mine can be performed continuously).

The measurement point availability determining unit 39 of the construction machine control system 30 removes a detection result in which reflection intensity is low, a detection result in which it is considered that a laser beam has passed through a transparent object, a detection result in which it is considered that a laser beam has detected dust, a detection result in which it is considered that a laser beam has been reflected, and a detection result in which it is considered that a laser beam has detected a lump of earth on the ground surface from the detection result of the laser sensor 24B as noise components. The measurement point availability determining unit 39 of the construction machine control system 30 removes a detection result in which the distance is equal to or larger than a largest distance, a detection result in which the distance is equal to or smaller than a smallest distance, a detection result in which the height is equal to or smaller than a predetermined height, and a detection result in which it is expected that the construction machine 4 other than the subject vehicle is detected from the detection result of the laser sensor 24B. As a result, the construction machine control system 30 can decrease the amount of information other than the vertical projection VP in the map information MI stored in the map storage database 36 and reduce the amount of information stored in the map storage database 36 provided in the dump truck 2. Moreover, since the matching navigation calculation unit 33B can specify the position and direction of the subject vehicle based on the map information MI with little noise, it is possible to accurately specify the position of the dump truck 2.

The matching navigation calculation unit 33B of the construction machine control system 30 further reduces the detection result by passing the detection result of the laser sensor 24B in which various noise components are removed through an isolation filter. As a result, the construction machine control system 30 can specify the position of the dump truck 2 in realtime even when the position measurement controller 33 provided in the dump truck 2 has a limited processing capability. Moreover, even when it is not possible to specify the position and direction using a GPS, the construction machine control system 30 can allow the dump truck 2 to travel continuously (that is, the operations of the mine can be performed continuously).

The matching navigation calculation unit 33B of the construction machine control system 30 performs various diagnoses at the position and direction of the dump truck 2 detected by the particle filter PF, it is possible to suppress a detection error in the position and direction of the dump truck 2. As a result, even when it is not possible to specify the position and direction using a GPS, the construction machine control system 30 can allow the dump truck 2 to travel continuously (that is, the operations of the mine can be performed continuously).

When the solution of the GPS position detected by the GPS receiver 31 is the Fix solution, the construction machine control system 30 creates the map information MI based on the detection result of the laser sensor 24B and stores the map information MI. When the solution of the GPS position detected by the GPS receiver 31 is not the Fix solution, the construction machine control system 30 compares the detection result of the laser sensor 24B and the map information MI stored in the map storage database 36 to specify the position and direction of the dump truck 2. As described above, in the construction machine control system 30, each dump truck 2 creates the map information MI, and when the error in the GPS position exceeds a predetermined error, each dump truck 2 travels using the map information MI created by itself. As a result, even when the grids GR of the map information MI are composed of information indicating whether the vertical projection VP is present (that is, 0 or 1) and a difference occurs in the detection results of the laser sensors 24B between the dump trucks 2 due to an individual difference of the dump trucks 2, the construction machine control system 30 can detect the position of the subject vehicle with high accuracy using the map information MI created by itself. Thus, even when it is not possible to specify the position and direction using a GPS, the construction machine control system 30 can allow the dump truck 2 to travel continuously (that is, the operations of the mine can be performed continuously).

Second Embodiment

<Construction Machine Control Method>

Figure 19:
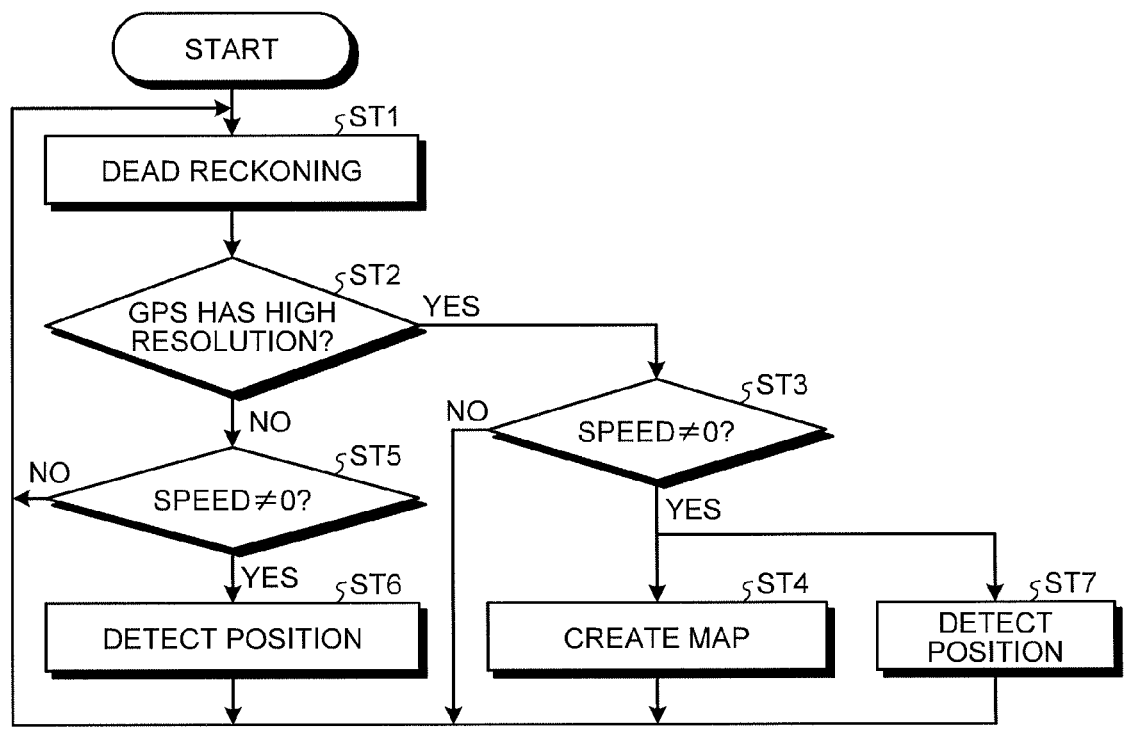
FIG. 19 is an example of a flowchart of a construction machine control system according to a second embodiment.
Figure 20:
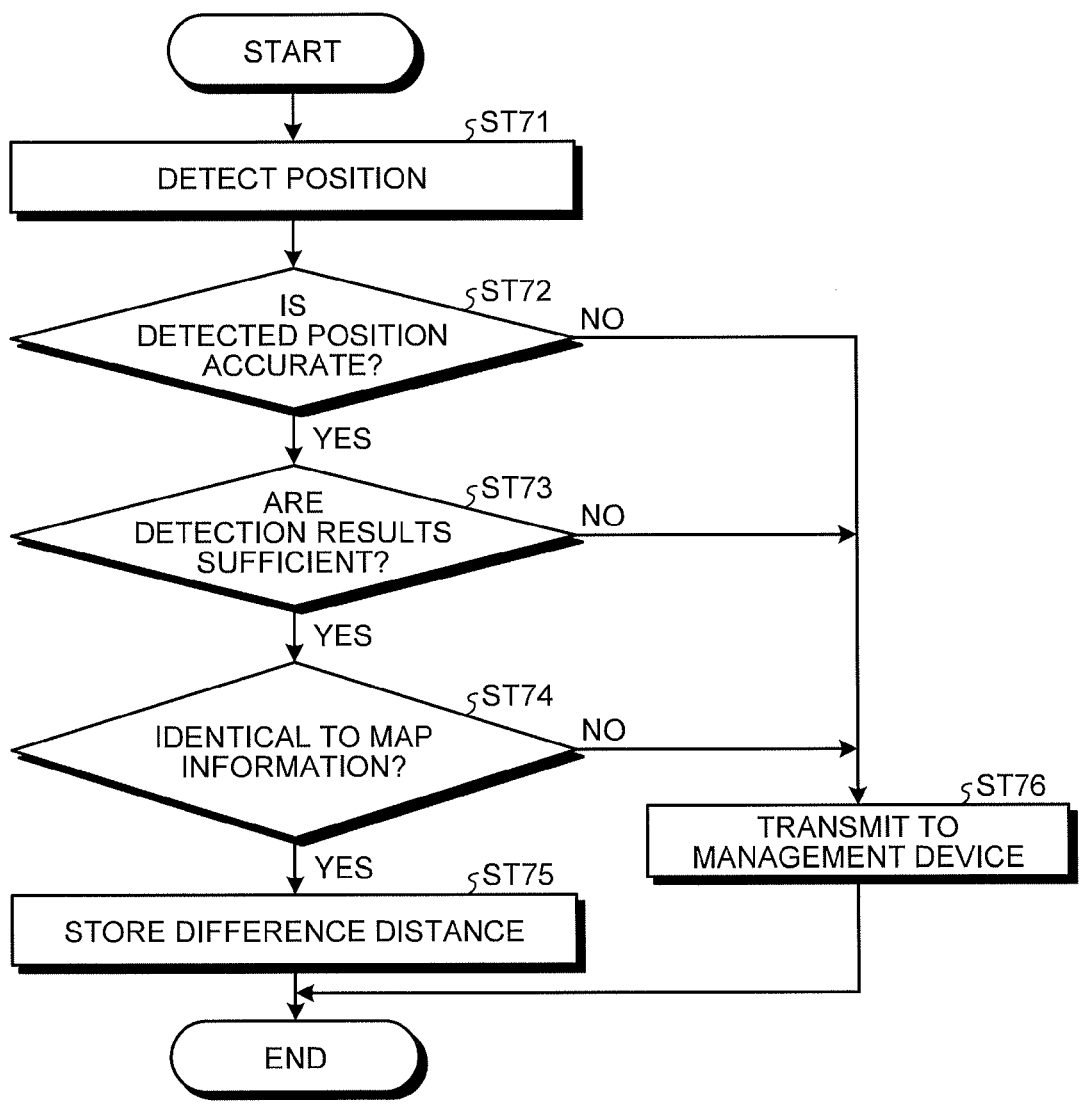
FIG. 20 is an example of the flowchart of step ST7 in FIG. 19.

Next, a construction machine control method according to a second embodiment (that is, an example of the operation of the construction machine control system 30) will be described. FIG. 19 is an example of the flowchart of a construction machine control system according to the second embodiment. FIG. 20 is an example of the flowchart of step ST7 in FIG. 19. In FIGS. 19 and 20, the same portions as those of the first embodiment will be denoted by the same reference numerals, and the description thereof will be omitted. The construction machine control system of the second embodiment has the same configuration as the construction machine control system 30 of the first embodiment.

According to the construction machine control method of the second embodiment, when the determining unit 33A of the position measurement controller 33 determines that the travel speed of the dump truck 2 is not 0 (that is, the dump truck 2 is not in the stopped state) (step ST3: Yes), the grid map creating unit 33C creates the map information MI (step ST4), and the matching navigation calculation unit 33B specifies the position and direction of the dump truck 2 based on the detection result of the laser sensor 24B and the map information MI stored in the map storage database 36 and checks the accuracy of the detected position and direction (step ST7).

Specifically, similarly to the first embodiment, the measurement point coordinate conversion unit 38 converts the position of the detection result of the laser sensor 24B to the X-Y coordinate position. The measurement point availability determining unit 39 extracts the detection result related to the vertical projection VP from the detection result which has been coordinate-converted and combines the detection result into a detection result of which the position is expressed by the X-Y coordinate and which is composed of a plurality of grids GR. The detection result combined by the grid map creating unit 33C is stored in the map storage database 36 as the map information MI. The matching navigation calculation unit 33B specifies the position and direction of the dump truck 2 based on the detection result of the laser sensor 24B and the map information MI stored in the map storage database 36 (step ST71).

The position measurement controller 33 determines whether the position of the dump truck 2 detected by the matching navigation calculation unit 33B has high accuracy (step ST72). Specifically, the determining unit 33A converts the GPS position detected by the GPS receiver 31 to the X-Y coordinate position and the position measurement controller 33 detects the distance (a difference distance) between the position obtained by the determining unit 33A converting the GPS position to the X-Y coordinate position and the position of the dump truck 2 detected by the matching navigation calculation unit 33B. The position measurement controller 33 determines that the position of the dump truck 2 detected by the matching navigation calculation unit 33B has high accuracy when the distance between the position obtained by the determining unit 33A converting the GPS position to the X-Y coordinate position and the position detected by the matching navigation calculation unit 33B is equal to or smaller than a predetermined distance. The position measurement controller 33 determines that the position of the dump truck 2 detected by the matching navigation calculation unit 33B does not have high accuracy when the distance between the position obtained by the determining unit 33A converting the GPS position to the X-Y coordinate position and the position detected by the matching navigation calculation unit 33B exceeds the predetermined distance. The predetermined distance is a distance at which the dump truck 2 can perform autonomous travel when the GPS position detected by the GPS receiver 31 is not the Fix solution.

When it is determined that the position of the dump truck 2 detected by the matching navigation calculation unit 33B has high accuracy (step ST72: Yes), the position measurement controller 33 determines whether the number of the detection results detected by the laser sensor 24B is sufficient (step ST73). Specifically, the position measurement controller 33 determines that the number is sufficient when the number of the detection results detected by the laser sensor 24B is equal to or larger than a predetermined number and determines that the number is not sufficient when the number is smaller than the predetermined number. The predetermined number is a number at which the dump truck 2 can perform autonomous travel when the solution of the GPS position detected by the GPS receiver 31 is not the Fix solution.

When it is determined that the number of the detection results detected by the laser sensor 24B is sufficient (step ST73: Yes), the position measurement controller 33 determines whether the detection result of the laser sensor 24B detected by the measurement point availability determining unit 39 is identical to the map information MI stored in the map storage database 36 (step ST74). Specifically, the position measurement controller 33 performs pattern-matching on the detection result detected by the laser sensor 24B and the map information MI stored in the map storage database 36 using normalized correlation and determines that the two items of data are identical when a correlation value is equal to or larger than a predetermined value while determining that the two items of data are not identical when the correlation value is smaller than the predetermined value. The predetermined value is a value at which the dump truck 2 can perform autonomous travel when the solution of the GPS position detected by the GPS receiver 31 is not the Fix solution.

When the position measurement controller 33 determines that the detection result of the laser sensor 24B detected by the measurement point availability determining unit 39 is identical to the map information MI stored in the map storage database 36 (step ST74: Yes), the determining unit 33A stores the distance between the position obtained by converting the GPS position to the X-Y coordinate position and the position of the dump truck 2 detected by the matching navigation calculation unit 33B in a nonvolatile memory 335 (step ST75). In step ST75, the position measurement controller 33 always detects an average distance of the distance between the position obtained by the determining unit 33A converting the GPS position to the X-Y coordinate position and the position of the dump truck 2 detected by the matching navigation calculation unit 33B and stores the average distance in the nonvolatile memory 335. In step ST6, the position measurement controller 33 corrects the detected position and direction of the dump truck 2 using the average distance when the matching navigation calculation unit 33B specifies the position and direction of the dump truck 2 based on the detection result of the laser sensor 24B and the map information MI stored in the map storage database 36 to allow the dump truck 2 to travel along the travel route RP.

When the position of the dump truck 2 detected by the matching navigation calculation unit 33B does not have high accuracy (step ST72: No), when it is determined that the number of the detection results detected by the laser sensor 24B is not sufficient (step ST73: No), or when it is determined that the detection result of the laser sensor 24B detected by the measurement point availability determining unit 39 is not identical to the map information MI stored in the map storage database 36 (step ST74: No), the position measurement controller 33 determines that the position and direction of the dump truck 2 detected by the matching navigation calculation unit 33B is not appropriate for autonomous travel and transmits a determination result to the wireless communication device 18 of the control facility 7 via the wireless communication device 34. Upon receiving the determination result that the position and direction of the dump truck 2 is not appropriate for autonomous travel, the control facility 7 stores the determination result in the storage device 13 (step ST76).

In the position measurement controller 33 of the second embodiment, when it is determined that the error in the GPS position of the dump truck 2 detected by the GPS receiver 31 is equal to or smaller than the predetermined error (step ST2: Yes), the grid map creating unit 33C creates the map information MI (step ST4) and the matching navigation calculation unit 33B specifies the position and direction of the dump truck 2 and checks the accuracy of the detected position and direction (step ST7). By doing so, when the determining unit 33A determines that the error in the GPS position detected by the GPS receiver 31 is equal to or smaller than the predetermined error, the position measurement controller 33 specifies the position and direction of the dump truck 2 by comparing the detection result of the laser sensor and the map information MI stored in the map storage database 36 and determines whether it is appropriate to allow the dump truck 2 to travel along the travel route RP based on the position of the dump truck 2 specified by the position measurement controller 33.

Moreover, the position measurement controller 33 of the second embodiment stores the difference distance in step ST75. In this way, the position measurement controller 33 detects and stores the difference (the difference distance) between the position and direction detected by the determining unit 33A and the position and direction of the dump truck 2 obtained by comparing the detection result of the laser sensor 24B and the map information MI of the travel route RP stored in the map storage database 36 when the determining unit 33A determines that the error in the GPS position detected by the GPS receiver 31 is equal to or smaller than the predetermined error.

In the second embodiment, the construction machine control system 30 detects a distance (difference distance) between the position of the dump truck 2 detected by the determining unit 33A and the position of the dump truck 2 detected by the matching navigation calculation unit 33B based on the GPS position detected by the GPS receiver 31 and determines whether the position and direction of the dump truck 2 detected by the matching navigation calculation unit 33B enable autonomous travel. Due to this, the construction machine control system 30 can check the accuracy of the position detected by the matching navigation calculation unit 33B in a period in which autonomous travel is performed in a state in which the error in the GPS position detected by the GPS receiver 31 is equal to or smaller than the predetermined error. As a result, in addition to the advantages of the first embodiment, the construction machine control system 30 can urge the operator to take countermeasures such as providing a landmark that the laser sensor 24B can detect at a place where the position and direction detected by the matching navigation calculation unit 33B do not allow autonomous travel and allowing the dump truck to travel several times while detecting the position of the place where autonomous travel is not allowed. Moreover, even when it is not possible to specify the position and direction using a GPS, the construction machine control system 30 can allow the dump truck 2 to travel continuously (that is, the operations of the mine can be performed continuously).

The construction machine control system 30 detects and stores an average distance of the distance (difference distance) between the position of the dump truck 2 detected by the determining unit 33A and the position of the dump truck 2 detected by the matching navigation calculation unit 33B based on the GPS position detected by the GPS receiver 31. The construction machine control system 30 corrects the detected position and direction of the dump truck 2 using the average distance when the position and direction of the dump truck 2 are specified based on the detection result of the laser sensor 24B and the map information MI stored in the map storage database 36 to allow the dump truck 2 to travel along the travel route RP. As a result, even when the position of the dump truck 2 detected by the determining unit 33A shifts from the position of the dump truck 2 detected by the matching navigation calculation unit 33B due to an attachment error of the laser sensor 24B, and it is not possible to specify the position and direction using a GPS, the construction machine control system 30 can allow the dump truck 2 to travel continuously (that is, the operations of the mine can be performed continuously).

In the construction machine control system 30 of the second embodiment, when it is determined that the error in the GPS position detected by the GPS receiver 31 is equal to or smaller than the predetermined error (step ST2: Yes), the matching navigation calculation unit 33B may detect the position, direction, and difference distance of the dump truck 2, check the accuracy of the detected position and direction, and store the difference distance similarly to step ST7 in at least a portion of the period in which the grid map creating unit 33C creates the map information MI.

In the first and second embodiments, the navigation system 30 creates the map information MI and specifies the position and direction of the dump truck 2 based on the detection result of the laser sensor 24B. In the present invention, the navigation system 30 may create the map information MI and specify the position and direction of the dump truck 2 based on the detection result of the radar 24A which is a non-contact sensor. Moreover, in the present invention, the navigation system 30 may create the map information MI and specify the position and direction of the dump truck 2 based on the detection result of a plurality of charge-coupled device (CCD) cameras provided in the dump truck 2, which is a non-contact sensor.

The constituent elements disclosed in the embodiments include those easily conceivable by a person of ordinary skill in the art and those substantially equivalent thereto, that is, those within the range of equivalence. Further, the constituent elements of the respective embodiments can be appropriately combined with each other. Further, some of the constituent elements may not be used.

In the embodiments, although a mining machine used in a mine has been described as an example, the present invention is not limited to this but can be applied to a construction machine used in an underground mine and a construction machine used in a working site on the ground. The construction machine includes a mining machine.

In the embodiments, although the position of the mining machine is detected using the GPS receiver 31, the present invention is not limited to this but the position of the mining machine may be detected based on a well-known "position detection unit." In particular, since the GPS cannot be detected in an underground mine, self-localization of a construction machine which uses IMES (indoor messaging system), a pseudo satellite (pseudo-lite), RFID (radio frequency identifier), a beacon, a surveying instrument, a wireless LAN, UWB (ultra wide band), SLAM (simultaneous localization and mapping), and a landmark (a mark provided to the sides of a travel route) which are existing position detection devices, for example, may be used. These position detection devices may be used in a mining machine used in a mine on the ground or a construction machine used in a working site on the ground.

Moreover, in the embodiments, although a control system for a dump truck in a mine on the ground has been described as an example of the "construction machine control system", the present invention is not limited to this but may include a construction machine control system for a construction machine which is another mining machine used in a mine on the ground, a construction machine used in an underground mine, or a construction machine (an excavator, a bulldozer, a wheel loader, or the like) used in a working site on the ground and which includes a "position detection device", a "non-contact sensor", and a "position calculating unit".

REFERENCE SIGNS LIST

1 MANAGEMENT SYSTEM
2 DUMP TRUCK (CONSTRUCTION MACHINE)
7 CONTROL FACILITY
10 MANAGEMENT DEVICE
20 TRAVEL CONTROLLER (CONTROL UNIT)
21 VEHICLE BODY
24A RADAR (NON-CONTACT SENSOR)
24B LASER SENSOR (NON-CONTACT SENSOR)
27 SPEED SENSOR
30 CONSTRUCTION MACHINE CONTROL SYSTEM
31 GPS RECEIVER (POSITION DETECTION UNIT)
32A ROUTE POSITION STORAGE UNIT (ROUTE POSITION STORAGE UNIT)
33 POSITION MEASUREMENT CONTROLLER (POSITION MEASUREMENT UNIT)
33A DETERMINING UNIT (DETERMINATION UNIT)
RP TRAVEL ROUTE
VP VERTICAL PROJECTION
BK BANK
MI MAP INFORMATION

The invention claimed is:

1. A construction machine control system for a construction machine that travels along a travel route, comprising:
a position detection unit including an antenna and configured to detect a position of the construction machine in communication with outside;
a determination unit implemented in a controller and configured to determine whether an error in the position detected by the position detection unit is equal to or smaller than a predetermined error;
a non-contact sensor configured to detect a position of an object around the construction machine; and
a map information storage unit including a map database and configured to extract data related to a vertical projection that protrudes vertically from the surface of the travel route, from a detection result of the non-contact sensor, store the extracted data related to the vertical projection as map information when the determination unit determines that the error in the position detected by the position detection unit is equal to or smaller than the predetermined error, and never store data from a detection result of the non-contact sensor when the determination unit determines that the error in the position detected by the position detection unit exceeds the predetermined error.

2. The construction machine control system according to claim 1, further comprising:
a position measurement unit implemented in a controller and configured to specify the position of the construction machine by comparing the detection result of the non-contact sensor and the map information stored by the map information storage unit when the determination unit determines that the error in the position detected by the position detection unit exceeds the predetermined error.

3. The construction machine control system according to claim 2, wherein
the position measurement unit stops specifying the position of the construction machine by comparing the detection result of the non-contact sensor and the map information stored by the map information storage unit when a stopped state of the construction machine is detected.

4. The construction machine control system according to claim 2, wherein
when the determination unit determines that the error in the position detected by the position detection unit is equal to or smaller than the predetermined error, the position measurement unit compares the detection result of the non-contact sensor and the map information stored by the map information storage unit to specify the position of the construction machine and determines whether it is appropriate to allow the construction machine to travel along the travel route based on the position of the construction machine specified by the position measurement unit.

5. The construction machine control system according to claim 4, wherein
when the determination unit determines that the error in the position detected by the position detection unit is equal to or smaller than the predetermined error, the position measurement unit detects and stores a distance between the position detected by the position detection unit and the position of the construction machine obtained by comparing the detection result of the non-contact sensor and the map information of the travel route stored by the map information storage unit.

6. A construction machine comprising:
the construction machine control system according to claim 1; and
a vehicle body that travels along a travel route provided in a mine.

7. A construction machine management system comprising:
the construction machine according to claim 6; and
a management device implemented in a computer disposed in a control facility provided in a mine, and configured to transmit information on a travel route provided in the mine to a construction machine control system of the construction machine.

8. A construction machine control system for a construction machine that travels along a travel route, comprising:
a position detection unit including an antenna and configured to detect a position of the construction machine in communication with outside;
a determination unit implemented in a controller and configured to determine whether an error in the position detected by the position detection unit is equal to or smaller than a predetermined error;
a non-contact sensor configured to detect a position of an object around the construction machine; and
a map information storage unit including a map database and configured to extract data related to a vertical projection that protrudes vertically from the surface of the travel route, from a detection result of the non-contact sensor, and store the extracted data related to the vertical projection as map information when the determination unit determines that the error in the position detected by the position detection unit is equal to or smaller than the predetermined error, wherein
the map information storage unit stops storing the map information when a stopped state of the construction machine is detected.

9. A construction machine control method for controlling a construction machine that travels along a travel route, comprising:
allowing the construction machine to travel along the travel route based on a position of the construction machine detected by a position detection unit communicated with outside;
extracting data related to a vertical projection that protrudes vertically from the surface of the travel route, from a detection result of the non-contact sensor that detects a position of an object around the construction machine when an error in the detected position of the construction machine is equal to or smaller than a predetermined error;
storing the extracted data related to the vertical projection as map information of the travel route; and
never storing data from a detection result of the non-contact sensor when the error in the detected position of the construction machine exceeds the predetermined error.

10. A computer program product having a non-transitory computer readable medium including programmed instructions,
wherein when the instructions are executed by a computer provided in a construction machine that travels along a travel route provided in a mine based on a position detected by a position detection unit communicated with outside, the instructions cause the computer to perform:
determining whether an error in the position of the construction machine detected using the position detection unit is equal to or smaller than a predetermined error;
extracting data related to a vertical projection that protrudes vertically from the surface of the travel route, from a detection result of the non-contact sensor that detects a position of an object around the construction machine when it is determined that the error in the detected position is equal to or smaller than the predetermined error;
storing the extracted data related to the vertical projection in a map information storage unit including a map database as map information of the travel route; and
never storing data from a detection result of the non-contact sensor when it is determined that the error in the position detected by the position detection unit exceeds the predetermined error.

* * * * *